(12) United States Patent
Yamamoto et al.

(10) Patent No.: US 8,042,887 B2
(45) Date of Patent: Oct. 25, 2011

(54) BRAKE CONTROL APPARATUS

(75) Inventors: Takayuki Yamamoto, Aichi-gun (JP);
Masaaki Komazawa, Nishikamo-gun
(JP); Yasushi Hanaki, Chiryu (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 1098 days.

(21) Appl. No.: 11/836,948

(22) Filed: Aug. 10, 2007

(65) Prior Publication Data

US 2008/0036294 A1    Feb. 14, 2008

(30) Foreign Application Priority Data

Aug. 10, 2006    (JP) .................................. 2006-218521

(51) Int. Cl.
*B60T 8/60* (2006.01)
(52) U.S. Cl. ............... 303/155; 303/167; 303/3; 303/20
(58) Field of Classification Search ............... 303/191, 303/167, 155, 20, 3; 701/78, 79
See application file for complete search history.

(56) References Cited

U.S. PATENT DOCUMENTS

| | | | | |
|---|---|---|---|---|
| 4,327,414 | A | * | 4/1982 | Klein ............................ 701/79 |
| 4,785,771 | A | * | 11/1988 | Ibuki et al. ............... 123/179.17 |
| 5,415,467 | A | * | 5/1995 | Utz et al. ......................... 303/89 |
| 6,053,584 | A | * | 4/2000 | Schunck et al. ............... 303/167 |
| 7,699,410 | B2 | * | 4/2010 | Beck et al. ..................... 303/155 |
| 2002/0074855 | A1 | | 6/2002 | Beck et al. |
| 2005/0184715 | A1 | | 8/2005 | Kidokoro et al. |

FOREIGN PATENT DOCUMENTS

| | | |
|---|---|---|
| DE | 100 47 761 A1 | 4/2002 |
| DE | 10 2005 006 867 A1 | 9/2005 |
| JP | 1-145277 | 6/1989 |
| JP | 2749383 | 2/1998 |
| JP | 2002-154415 | 5/2002 |
| JP | 2002-337682 | 11/2002 |
| JP | 2003-291693 | 10/2003 |
| JP | 2004352150 A * | 12/2004 |
| JP | 2005-81963 | 3/2005 |
| JP | 2005-244334 | 9/2005 |

* cited by examiner

*Primary Examiner* — Robert Siconolfi
*Assistant Examiner* — Mariano Sy
(74) *Attorney, Agent, or Firm* — Oblon, Spivak, McClelland, Maier & Neustadt, L.L.P.

(57) ABSTRACT

A brake control apparatus for controlling brakes of a vehicle having wheels, the apparatus including a stopped-state detecting portion which detects, based on a speed of at least one of the wheels detected by at least one wheel-speed sensor, a stopped state of the vehicle; an operation-force limiting portion which limits, based on a detection of the stopped state of the vehicle by the stopped-state detecting portion, an operation force of at least one of the brakes, such that an upper limit of the operation force is an intermediate level of an operation-force range used when the stopped state is not detected; a sensor ignoring portion which ignores, when an electric voltage supplied from a power source to the at least one wheel-speed sensor is not higher than a reference value, the at least one wheel-speed sensor; a limitation canceling portion which cancels, when the sensor ignoring portion ignores the at least one wheel-speed sensor, a limitation of the operation force by the operation-force limiting portion; and a rapid-change restraining portion which restrains a rapid change of the operation force caused by a cancellation of the limitation of the operation force by the limitation canceling portion.

9 Claims, 14 Drawing Sheets

BRAKE CONTROL APPARATUS

The present application is based on Japanese Patent Application No. 2006-218521 filed on Aug. 10, 2006, the contents of which are incorporated herein by reference.

BACKGROUND OF THE INVENTION

1. Field of the Invention

The present invention relates to a brake control apparatus and particularly to the art of controlling an operation force of a brake of a vehicle in a state in which the vehicle is stopped.

2. Discussion of Related Art

For example, Japanese Patent Application Publication No. 2002-154415 or Japanese Patent No. 2,749,383 discloses a brake control apparatus wherein, when a vehicle is in its stopped state, an upper limit of an operation force of a brake is made lower than an upper limit of the operation force when the vehicle is running, i.e., in its running state. In the disclosed brake control apparatus, a hydraulic brake that operates upon supplying of a hydraulic pressure to a wheel cylinder thereof is controlled such that if it is judged, based on an output signal of a wheel-speed sensor, that the vehicle is in its stopped state, an upper limit of the hydraulic pressure of the wheel cylinder is restricted, i.e., made lower than an upper limit of the hydraulic pressure when the vehicle is in its running state, so as to reduce loads applied to various elements of the brake.

In the above-described brake control apparatus, whether the vehicle is in its stopped state is judged based on a speed of a wheel of the vehicle that is represented by the output signal of the wheel-speed sensor. In this case, however, if the output signal of the wheel-speed sensor is not reliable, then a reliable judgment cannot be obtained. For example, if an electric voltage of an electric-power source that supplies an electric voltage to the wheel-speed sensor excessively lowers, then the electric voltage supplied to the sensor also lowers, and accordingly the output signal of the sensor may not be reliable. That is, although the vehicle is, in fact, in its running state, it may be erroneously judged that the vehicle is in its stopped state. In this case, if the upper limit of the hydraulic pressure of the wheel cylinder is restricted, then a braking force may be insufficiently low.

Hence, the inventors for the present application have attempted to provide a brake control apparatus that controls a hydraulic brake such that if an electric voltage of a power source that supplies an electric voltage to a wheel-speed sensor lowers to a value not greater than a pre-set value, then the wheel-speed sensor is disabled or ignored. That is, even if it may be judged based on an output signal of the wheel-speed sensor that a vehicle is in its stopped state, the judgment is ignored and an upper limit of a hydraulic pressure of a wheel cylinder of the hydraulic brake is not restricted, i.e., the hydraulic pressure is freely controlled to a value corresponding to a stroke of operation or depression of a brake pedal. In this case, when the vehicle is, in fact, not in its stopped state, a braking force of the hydraulic brake can be prevented from being insufficiently low.

However, in the above-described case, the hydraulic pressure of the wheel cylinder may be increased rapidly, and noise may be produced mainly from a hydraulic-pressure regulating valve (i.e., a pressure-increase valve). In addition, in the case where the voltage of the power source lowers just temporarily because of cranking of an engine, the power-source voltage may increase again in a considerably short time. In this case, the ignoring of the wheel-speed sensor is stopped soon, and the hydraulic pressure of the wheel cylinder is decreased rapidly, that is, noise may be produced from a hydraulic-pressure regulating valve (i.e., a pressure-decrease valve). In the case where the wheel-speed sensor is ignored because of cranking of the engine, the noise produced from the pressure-increase valve cannot be easily heard because the noise is mixed with the sounds produced by the cranking; but the noise produced from the pressure-decrease valve may be easily heard because the cranking has already ended, and accordingly one or more passengers in the vehicle feel discomfort or uneasiness. In addition, since the hydraulic pressure of the wheel cylinder is increased or decreased temporarily, a certain amount of energy is uselessly consumed.

In the case where the brake is an electric brake that includes, as a drive source thereof, an electric motor, the electric brake is free of the above-indicated problem that noise is produced from the hydraulic-pressure regulating valves. In this case, however, sounds are produced when the electric motor is operated. In addition, the electric brake suffers from the problem that a certain amount of energy is uselessly consumed.

SUMMARY OF THE INVENTION

In the above-indicated background, the present invention has been developed. It is therefore an object of the present invention to solve at least one of the above-identified problems. It is another object of the present invention to provide a brake control apparatus wherein even if an electric voltage of an electric-power source that supplies an electric voltage to a wheel-speed sensor may lower, an operation force of a brake is not rapidly changed.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the present invention or even one or more different inventions than the claimed inventions. Each of the following modes (1) through (9) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith but also the detailed description of the preferred embodiments of the invention, and that in additional claimable modes, one or more elements or one or more technical features may be added to, or deleted from, any of the following specific modes.

(1) A brake control apparatus for controlling a plurality of brakes of a vehicle having a plurality of wheels, the apparatus comprising a stopped-state detecting portion which detects, based on a speed of at least one of the wheels detected by at least one wheel-speed sensor, a stopped state of the vehicle; an operation-force limiting portion which limits, based on a detection of the stopped state of the vehicle by the stopped-state detecting portion, an operation force of at least one of the brakes, such that an upper limit of the operation force is an intermediate level of an operation-force range used when the stopped state is not detected; a sensor ignoring portion which ignores, when an electric voltage supplied from a power source to the at least one wheel-speed sensor is not higher than a reference value, the at least one wheel-speed sensor; a limitation canceling portion which cancels, when the sensor ignoring portion ignores the at least one wheel-speed sensor, a limitation of the operation force by the operation-force limiting portion; and a rapid-change restraining portion which restrains a rapid change of the operation force caused by a cancellation of the limitation of the operation force by the limitation canceling portion.

In the present brake control apparatus, even if the electric voltage supplied from the power source to the at least one wheel-speed sensor may be not higher than the reference value, the rapid change of the operation force of the at least one brake can be restrained. That is, the operation force of the at least one brake can be prevented from being rapidly increased or decreased, and accordingly noise that may cause one or more passengers to feel discomfort or uneasiness can be restrained. In addition, useless consumption of energy can be reduced or avoided.

Each of the brakes may be a hydraulic brake or an electric brake. In the case where the hydraulic brakes are employed, an operation force of each hydraulic brake may be a hydraulic pressure supplied to a wheel cylinder thereof; and in the case where the electric brakes are employed, an operation force of each electric brake may be a drive electric current supplied thereto.

(2) The brake control apparatus according to the mode (1), wherein the plurality of brakes comprise a plurality of hydraulic brakes each of which includes a wheel cylinder and operates, upon supplying of a hydraulic pressure to the wheel cylinder, to restrain a rotation of a corresponding one of the plurality of wheels, wherein the operation-force limiting portion comprises a hydraulic-pressure limiting portion which limits, based on the detection of the stopped state of the vehicle by the stopped-state detecting portion, the hydraulic pressure of the wheel cylinder of at least one of the hydraulic brakes, such that an upper limit of the hydraulic pressure is an intermediate level of a hydraulic-pressure range used when the stopped state is not detected, and wherein the rapid-change restraining portion comprises a hydraulic-pressure rapid-change restraining portion which restrains a rapid change of the hydraulic pressure of the wheel cylinder.

In the present brake control apparatus, the hydraulic pressure of the wheel cylinder is not rapidly increased from the restricted, intermediate level of the hydraulic-pressure range, or rapidly decreased from a higher pressure to the restricted intermediate level. Therefore, in the case where a hydraulic-pressure regulating valve is employed to regulate or control the hydraulic pressure of the wheel cylinder, a large amount of brake liquid does not flow through the regulating valve, which leads to preventing the generation of large sounds caused by the flowing of the large amount of brake liquid. In particular, if the voltage supplied from the power source to the wheel-speed sensor just temporarily lowers below the reference value because of cranking of an engine of the vehicle, then noise may be easily heard after the cranking ends. However, in the present brake control apparatus, the generation of large sounds caused by the flowing of the large amount of brake liquid can be effectively prevented.

(3) The brake control apparatus according to the mode (1) or the mode (2), wherein the rapid-change restraining portion comprises a stopped-state estimating portion which estimates, based on information from a member other than the at least one wheel-speed sensor, the stopped state of the vehicle; and a limitation-canceling inhibiting portion which inhibits, when the electric voltage of the power source is not higher than the reference value in a state in which the stopped-state estimating portion estimates that the vehicle is in the stopped state thereof, the limitation canceling portion from canceling the limitation of the operation force by the operation-force limiting portion.

The limitation-canceling inhibiting portion may be any means that eventually inhibits the limitation canceling portion from canceling the limitation of the operation force, i.e., may be one that directly inhibits the limitation canceling portion from canceling the limitation, or one that indirectly inhibits the limitation canceling portion from canceling the limitation, e.g., one that inhibits the sensor ignoring portion from ignoring the wheel-speed sensor. In the present brake control apparatus, even if the voltage supplied from the power source to the wheel-speed sensor may temporarily lower below the reference value because of, e.g., the cranking of the engine, the limitation canceling portion is inhibited from canceling the limitation. Therefore, the rapid change of the operation force of the brake can be prevented, and accordingly the generation of noise and/or the useless consumption of energy can be avoided.

The feature according to the mode (3) may, or may not, be combined with each of the features according to the following modes (4) through (9).

(4) The brake control apparatus according to any of the modes (1) through (3), wherein the rapid-change restraining portion comprises a gradient restraining portion which permits the limitation canceling portion to cancel the limitation of the operation force of the brake, and restrains at least one of a gradient of increase, and a gradient of decrease, of the operation force caused by the cancellation of the limitation of the operation force.

For example, in the case where the limitation canceling portion cancels the limitation of the operation force of the brake and consequently the operation force of the brake is increased, the gradient of increase of the operation force may be restrained by the gradient restraining portion. In this case, the operation force is more moderately increased as compared with the case where the gradient of increase of the operation force is not restrained at all. Therefore, the generation of noise can be effectively restrained. In addition, for example, if a time duration in which the wheel-speed sensor is ignored is considerably short, then the operation force of the brake may be changed from increasing to decreasing, in a state in which the operation force is considerably low yet. Thus, the operation force of the brake can be prevented from being uselessly increased, which leads to restraining the useless consumption of energy. Meanwhile, in the case where the gradient of decrease of the operation force is restrained by the gradient restraining portion, the generation of noise when the operation force is decreased can be effectively restrained.

(5) The brake control apparatus according to any of the modes (1) through (4), further comprising an operation-force control portion which controls the operation force of the at least one brake according to a control gain, wherein the rapid-change restraining portion comprises a gain decreasing portion which decreases the control gain from a normal-control gain to a restraining-control gain.

The above-indicated control gain may be a proportional gain with which a deviation as a difference of (a) an amount corresponding to a target operation force (e.g., the target operation force itself, a target hydraulic pressure, a target electric current, etc.) and (b) an actual amount corresponding to the target operation force is multiplied to obtain a control value; a derivative gain with which a derivative value of the deviation is multiplied to obtain a control value; or an integral gain with which an integral value of the deviation is multiplied to obtain a control value. The gain decreasing portion may be one that decreases all of the proportional gain, the derivative gain, and the integral gain, or one that decreases one or two of the three gains. The gain decreasing portion provides advantages similar to those provided by the above-described gradient restraining portion.

(6) The brake control apparatus according to any of the modes (1) through (5), further comprising: a brake operating member which is operable to operate the brakes; a target-value determining portion which determines, based on an amount of operation of the brake operating member, a target value of the operation force of each of the brakes; an operation-force control portion which controls the operation force of the each brake; a target-value supplying portion which normally supplies the target value determined by the target-value determining portion, to the operation-force control portion, wherein when the operation-force limiting portion limits the operation force of the at least one brake, such that the upper limit of the operation force is the determined target value, the target-value supplying portion supplies the upper limit to the operation-force control portion and, when the limitation canceling portion cancels the limitation of the operation force by the operation-force restricting portion, the target-value supplying portion again supplies the determined target value to the operation-force control portion; and a low-pass filter which removes a high-frequency component of the target values supplied by the target-value supplying portion, wherein the rapid-change restraining portion comprises the low-pass filter.

The target value may be a target operation force, a target hydraulic pressure, a target electric current, etc. The low-pass filter provides advantages similar to those provided by the above-described gradient restraining portion. Meanwhile, (a) a high-frequency component of the values detected by an operation-amount sensor that detects an amount of operation of the brake operating member, and/or (b) a high-frequency component of the control values determined by the target-value determining portion may be removed by a low-pass filter. In this case, a single or common low-pass filter may be used as not only the low-pass filter according to the mode (6) but also the low-pass filter to remove the above-indicated high-frequency component(s) (a) and/or (b). However, in the case where respective desirable characteristics of the above-indicated two low-pass filters differ from each other, the two low-pass filters need to be selectively used, or the characteristics of the single or common low-pass filter need to be changed, according to the above-indicted different operating states of the target-value supplying portion.

(7) The brake control apparatus according to any of the modes (1) through (6), wherein the rapid-change restraining portion comprises an increase restraining portion which permits the limitation canceling portion to cancel the limitation of the operation force of the at least one brake, and restrains at least one of a gradient of increase, and an amount of increase, of the operation force after the cancellation of the limitation of the operation force.

Each of the above-described gradient restraining portion, the gain decreasing portion, or the low-pass filter is an example of the increase restraining portion that restrains the gradient of increase of the operation force, and a restricted-value changing portion according to the following mode (8) is an example of the increase restraining portion that restrains the amount of increase of the operation force.

(8) The brake control apparatus according to any of the modes (1) through (7), wherein the increase restraining portion comprises a restricted-value changing portion which changes a first restricted value as the upper limit of the operation force, provided by the operation-force limiting portion, to a second restricted value greater than the first restricted value.

If the restricted-value changing portion changes the first restricted value to the second restricted value, then the operation force of the brake is permitted to be increased from the first restricted value to the second restricted value. Subsequently, e.g., if the ignoring of the wheel-speed sensor is cancelled, then the operation force of the brake is decreased from the second restricted value to the first restricted value and is controlled under the first restricted value again. However, e.g., if the lowering of the voltage of the power source is not caused by cranking of an engine of the vehicle and the ignoring of the wheel-speed sensor is not cancelled within a pre-set time duration, then the control of the operation force of the brake under the second restricted value is stopped, and the operation force is permitted to be freely increased to a value corresponding to an amount of operation of the brake operating member, such as an operating force applied to the brake operating member or a stroke of operation of the same. In the case where the operation force of the brake is decreased from the second restricted value to the first restricted value, noise is reduced and energy consumption is decreased; and in the case where the control of the operation force of the brake under the second restricted value is stopped, a delay of the increasing of the operation force of the brake from the second restricted value to the value corresponding to the amount of operation of the brake operating member is smaller than a delay of the increasing of the operation force of the brake from the first restricted value to the same value. In a particular case where the brake is constituted by a hydraulic brake, the brake control apparatus is employed by a hydraulic brake system in which a failure of a hydraulic system can be judged, and the rapid-change restraining portion of the brake control apparatus comprises the gradient restraining portion, the gain decreasing portion, the low-pass filter, or the restricted-value changing portion, it is preferred that when the increase of the wheel-cylinder pressure is intentionally restrained, the failure of the hydraulic system be not judged, or the time duration in which the failure is judged be increased. That is, it is preferred that the hydraulic system be not judged to have failed because of the intentional restraining of the increase of the wheel-cylinder pressure. This is also true with another particular case where the brake is constituted by an electric brake, and the brake control apparatus is employed by an electric braking system in which a failure of an electric system can be judged.

(9) The brake control apparatus according to any of the modes (1) through (8), wherein the rapid-change restraining portion comprises an ignoring delaying portion which delays, for a pre-set time duration after the electric voltage supplied from the power source to the at least one wheel-speed sensor becomes not higher than the reference value, an ignoring of the at least one wheel-speed sensor by the sensor ignoring portion.

The pre-set time duration may be longer than, e.g., a time duration in which the temporary lowering of the voltage of the power source continues. In this case, even if the voltage of the power source may temporarily lower to below the reference value, the wheel-speed sensor is not ignored and the rapid change of the operation force of the brake is prevented, which leads to avoiding the generation of noise. On the other hand, if the pre-set time duration elapses in the state in which the voltage of the power source is not higher than the reference value, then the wheel-speed sensor is ignored, and the operation force of the brake that corresponds to the amount of operation of the brake operating member can be obtained.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described preferred embodiments of the present invention by reference to the drawings.

Figure 1:
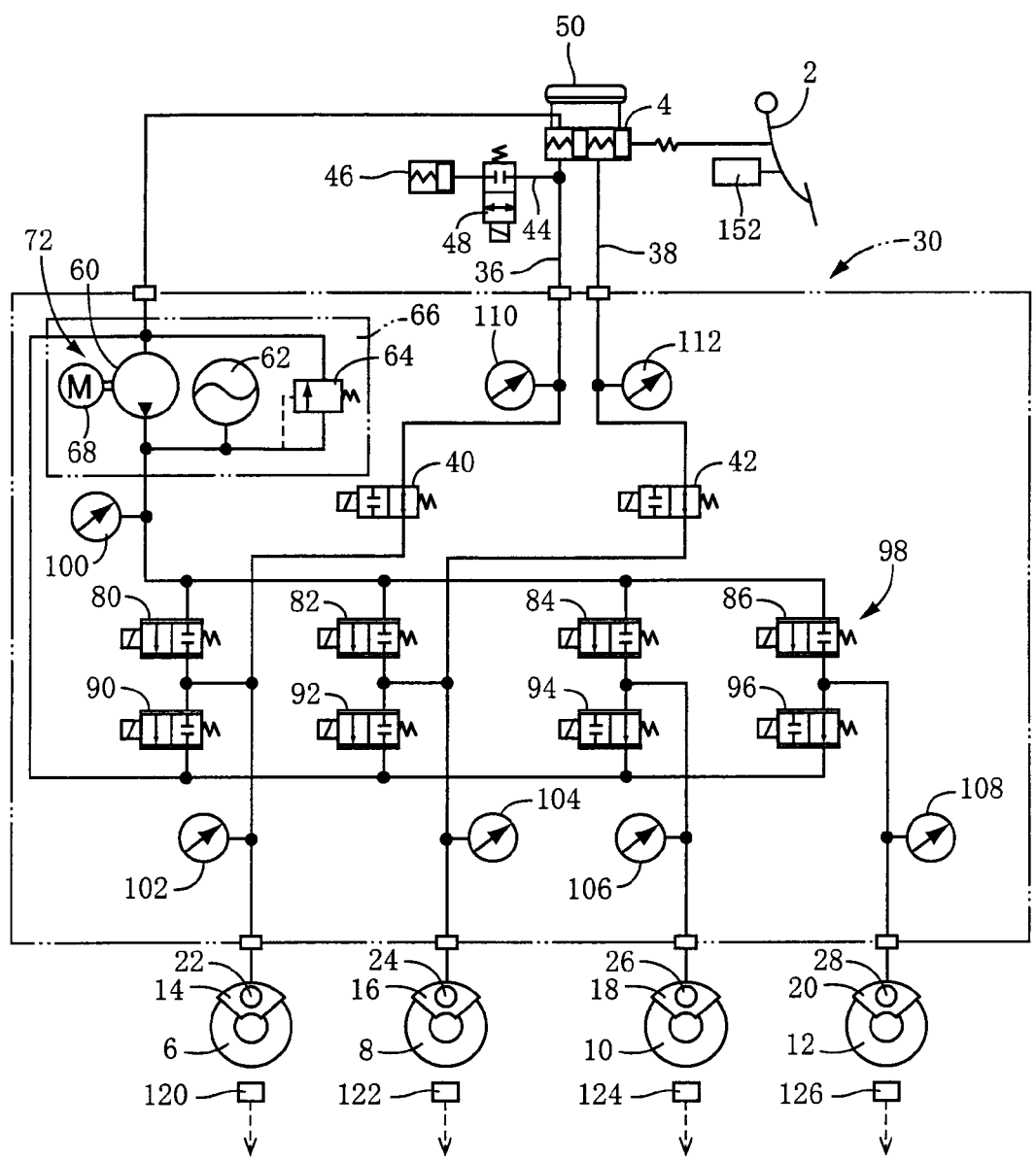
FIG. 1 is a diagrammatic view of a hydraulic brake system including a brake control apparatus to which the present invention is applied.

FIG. 1 shows a hydraulic brake system including a brake control apparatus to which the present invention is applied. The present hydraulic brake system includes a brake pedal 2 as a brake operating member; a master cylinder 4 that produces a hydraulic pressure based on an operation or depression of the brake pedal 2; four hydraulic brakes 14, 16, 18, 20 that are respectively provided for four wheels 6, 8, 10, 12 of an automotive vehicle, i.e., a front and left wheel 6, a front and right wheel 8, a rear and left wheel 10, and a rear and right wheel 12, and that include respective wheel cylinders 22, 24, 26, 28; and a brake actuator 30 that controls respective wheel-cylinder pressures as respective hydraulic pressures in the respective wheel cylinders 22, 24, 26, 28. The present hydraulic brake system carries out a braking operation, selectively (A) in a manual mode in which the hydraulic brakes 14, 16 are operated based on the hydraulic pressure produced by the master cylinder 4 upon the operation or depression of the brake pedal 2 by a driver (i.e., a driving person), and (B) in an electric-control mode in which the wheel-cylinder pressures are electrically controlled by the operation of the brake actuator 30.

In the present hydraulic brake system, the master cylinder 4 has two pressurizing chambers one of which is connected via a liquid passage 36 to the wheel cylinder 22 corresponding to the front and left wheel 6 and the other of which is connected via a liquid passage 38 to the wheel cylinder 24 corresponding to the front and right wheel 8. Two master-cut valves 40, 42 are provided in the two liquid passages 36, 38, respectively. A stroke simulator 46 is connected via a liquid passage 44 to a portion of the liquid passage 36 that is located between the master cylinder 4 and the master-cut valve 40, and a simulator communication valve 46 is provided in the liquid passage 44. In addition, a reservoir 50 that stores a brake liquid is connected to each of the two pressurizing chambers of the master cylinder 4.

As shown in FIG. 1, the brake actuator 30 has a powered hydraulic-pressure source 66 including a pump 60 that pumps up the brake liquid from the reservoir 50; an accumulator 62 that accommodates, under pressure, the brake liquid outputted from the pump 60; and a relief valve 64 that prevents the pressure of the brake liquid outputted from the pump 60, from being excessively increased. The pump 60 is for changing the pressure of the brake liquid accommodated by the accumulator 62, i.e., the hydraulic pressure of the same 62, and is driven by a pump motor 68 as a drive source. When the pump motor 68 is controlled by a computer of a brake ECU (electronic control unit) 150, described later, the hydraulic pressure of the accumulator 62 can be maintained within a predetermined pressure range. The pump 60 and the pump motor 68 cooperate with each other to provide a pump device 72. The brake actuator 30 further includes four pressure-increase valves 80, 82, 84, 86 that control respective flows of the brake liquid from the powered hydraulic-pressure source 66 to the corresponding wheel cylinders 22, 24, 26, 28; and four pressure-decrease valves 90, 92, 94, 96 that control respective flows of the brake liquid from the corresponding wheel cylinders 22, 24, 26, 28 to the reservoir 50. The pressure-increase valves 80, 82, 84, 86 and the pressure-decrease valves 90, 92, 94, 96 cooperate with each other to constitute a hydraulic-pressure regulating portion 98. In the present embodiment, each of the pressure-increase valves 80, 82, 84, 86 and the pressure-decrease valves 90, 92, 94, 96 is constituted by a linear hydraulic-pressure regulating valve that includes a solenoid and that linearly regulates a hydraulic pressure according to an electric current supplied to the solenoid.

A hydraulic-pressure sensor 100 is provided between the pump 60 and the pressure-increase valves 80, 82, 84, 86, and detects the pressure of the brake liquid supplied by the powered hydraulic-pressure source 66, i.e., the hydraulic pressure of the same 66. In addition, four wheel-cylinder-pressure sensors 102, 104, 106, 108 detect the respective hydraulic pressures of the four wheel cylinders 22, 24, 26, 28. Moreover, two master-cylinder-pressure sensors 110, 112 are provided between the two pressurizing chambers of the master cylinder 4 and the two master-cut valves 40, 42, respectively, and detect the respective hydraulic pressures produced in the two pressurizing chambers. Four wheel-speed sensors 120, 122, 124, 126 detect respective speeds of rotation of the four wheels 6, 8, 10, 12.

Figure 2:
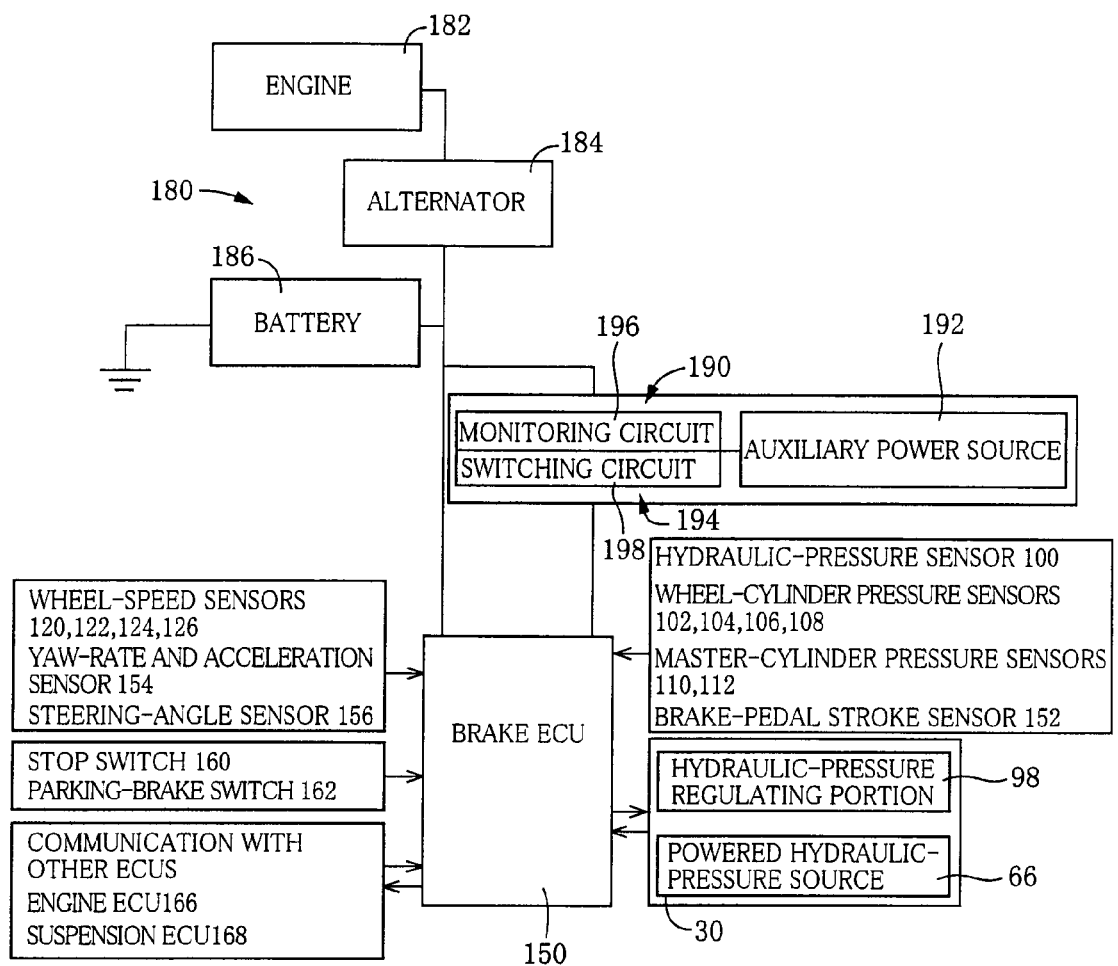
FIG. 2 is a diagrammatic view of an electric circuit of an electric control portion of the hydraulic brake system.

As shown in FIG. 2, the present hydraulic brake system is controlled by the brake ECU 150 that is essentially constituted by a computer. The hydraulic-pressure sensor 100, the wheel-cylinder-pressure sensors 102, 104, 106, 108, and the master-cylinder-pressure sensors 110, 112 are connected to the brake ECU 150, so that the respective hydraulic-pressure values detected by those sensors are inputted to the ECU 150. In addition, a brake-pedal-stroke sensor 152 as a brake-operation-amount detector is connected to the brake ECU 150, so that a stroke of operation or depression of the brake pedal 2 detected by the sensor 152 is inputted to the ECU 150. The stroke of depression of the brake pedal 2 is an amount of operation of the brake pedal 2 as an amount of operation of the brake operating member.

Moreover, the wheel-speed sensors 120, 122, 124, 126 are connected to the brake ECU 150, so that the respective rotation speeds of the four wheels 6, 8, 10, 12 are inputted to the ECU 150. In addition, a yaw-rate and acceleration sensor 154, a steering-angle sensor 156, a stop switch 160, and a parking-brake switch 162 are connected to the brake ECU 150, so that respective detection signals outputted from those sensors are inputted to the ECU 150. The stop switch 160 detects a state of operation or depression of the brake pedal 2 and, for example, when the pedal 2 is operated or depressed by the driver (i.e., when the hydraulic brake system is operated), the stop switch 160 outputs an ON signal and, when the pedal 2 is not depressed by the driver (i.e., when the brake system is not operated), the stop switch 160 outputs an OFF signal. The parking-brake switch 162 detects a state of operation of a parking-brake operating member such as a parking-brake operating lever (not shown) and, for example, when the parking-brake operating lever is not operated by the driver, i.e., when a parking brake is not operated, the parking-brake switch 162 outputs an OFF signal and, when the parking-brake operating lever is operated, i.e., when the parking brake is operated, the parking-brake switch 162 outputs an ON signal.

In addition, other ECUs including an engine ECU 166 and a suspension ECU 168 are connected to the brake ECU 150. The brake ECU 150 and the other ECUs 166, 168 communicate various commands and/or various information with each other. The brake ECU 150 controls via respective driver circuits (not shown) the respective solenoids of the pressure-increase valves 80, 82, 84, 86 and the pressure-decrease valves 90, 92, 94, 96 of the hydraulic-pressure regulating portion 98, the pump motor 68 of the powered hydraulic-pressure source 66, the respective solenoids of the master-cut valves 40, 42, and the solenoid of the simulator communication valve 48.

The brake ECU 150 and the above-described various sensors and solenoid valves can operate with supply of an electric voltage by a main power-source device 180 that includes (a) an alternator 184 driven by an engine 182, and (b) a battery 186. The present hydraulic brake system additionally includes an auxiliary power-source device 190 that includes an auxiliary power source 192 and a switching portion 194. The switching portion 194 includes a monitoring circuit 196 that monitors an electric voltage of the battery 186; and a switching circuit 198 that selectively establishes a first state in which the main power-source device 180 supplies the electric voltage to the brake ECU 150 and the various sensors and valves, and a second state in which the auxiliary power-source device 190 supplies the electric voltage to the ECU 150, i.e., switches the first and second states to and from each other. That is, when the monitoring circuit 196 detects that the electric voltage of the battery 186 has lowered to a value not higher than a reference value, the switching circuit 198 switches the first state to the second state so that the auxiliary power-source device 190 supplies the electric voltage to the ECU 150. The electric voltage of the battery 186 is detected by the monitoring circuit 196 or the engine ECU 166, and is supplied to the brake ECU 150. Alternatively, it is possible to employ an electric-voltage detecting device that detects the electric voltage of the battery 186 and supplies the detected voltage to the brake ECU 150. The computer that essentially constitutes the brake ECU 150 includes a memory that stores various control programs and data such as a main routine, not shown, and a braking control routine represented by a flow chart shown in FIG. 4.

Figure 3:
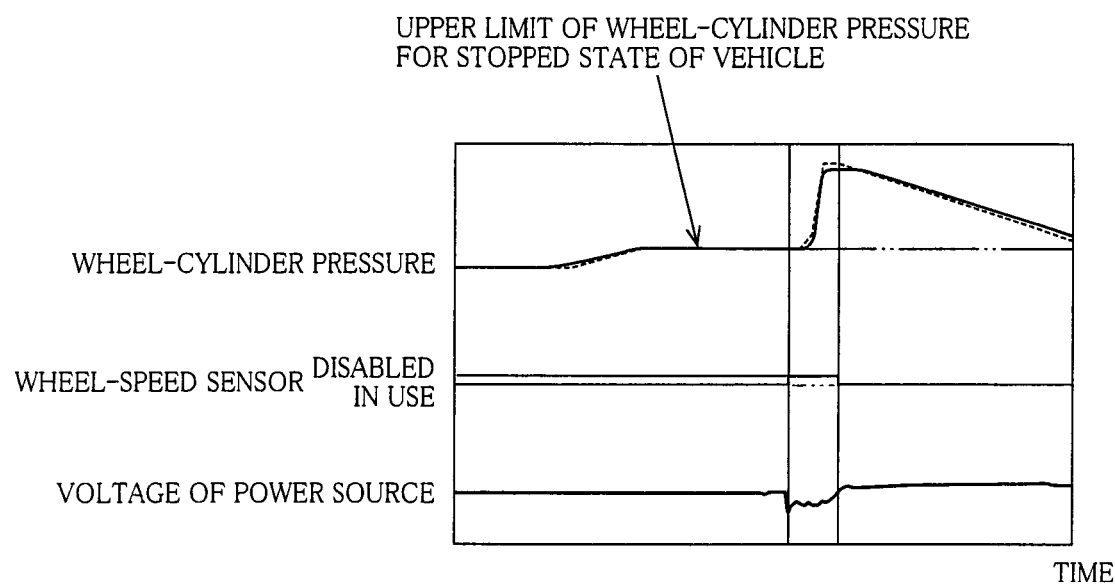
FIG. 3 is a graph for explaining a manner in which the brake control apparatus controls a wheel-cylinder pressure when an electric voltage of a power source of the hydraulic brake system lowers.

Usually, the present hydraulic brake system carries out a braking operation in the electric-control mode. In electric-control mode, the master-cut valves 40, 42 are closed, and the simulator communication valve 48 is opened. In addition, based on a magnitude of the stroke of depression of the brake pedal 2 by the driver, respective target hydraulic pressures to be supplied to the four wheel cylinders 22, 24, 26, 28 are determined, and the four pressure-increase valves 80, 82, 84, 86 and the four pressure-decrease valves 90, 92, 94, 96 are so controlled as to supply the corresponding determined target hydraulic pressures to the corresponding wheel cylinders 22, 24, 26, 28. As shown in FIG. 3, the present hydraulic brake system is adapted such that in a state in which the vehicle is stopped, each of the wheel-cylinder pressures is limited such that an upper limit of the each wheel-cylinder pressure is equal to an intermediate level of a wheel-cylinder-pressure range that is used in a state in which the vehicle is not stopped, for example, is running on a road. The respective upper limits of the wheel-cylinder pressures used when the vehicle is in its stopped state (hereinafter, referred to as the restricted upper limits) are set to be considerably low but sufficiently high to be able to maintain the vehicle at its stopped state. In the state in which the vehicle is stopped, even if the detected stroke of depression of the brake pedal 2 may indicate or command such target hydraulic pressures that are higher than the restricted upper limits, the respective wheel-cylinder pressures are limited under the restricted upper limits; and if the detected stroke of depression of the brake pedal 2 may indicate or command such target hydraulic pressures that are lower than the restricted upper limits, the respective wheel-cylinder pressures are controlled to those target hydraulic pressures. In the graph shown in FIG. 3, a broken line indicates a target hydraulic pressure, and a solid line indicates an actual wheel-cylinder pressure that is actually controlled to the target hydraulic pressure.

However, whether the vehicle is in its stopped state is judged by judging whether each of the respective wheel speeds calculated based on the respective rotation speeds detected by the wheel-speed sensors 120, 122, 124, 126 is equal to zero (more strictly, whether the each wheel speed is not higher than a threshold positive value near zero). Therefore, for example, if the electric voltage supplied to the wheel-speed sensors 120, 122, 124, 126 has lowered and accordingly the rotation speeds detected by those sensors have become unreliable, then the above judgment cannot be made with accuracy. The electric voltage of the main power source device 180 may temporarily lower, for example, when the engine 182 is cranking in a state in which the battery 186 as a power source has deteriorated. The auxiliary power source 192 discharges electricity, for the purpose of improving its life expectancy, when an ignition switch, not shown, is turned off. Therefore, when the engine 182 is cranking, i.e., is started, the electric voltage of the auxiliary power source 192 is considerably low and accordingly cannot supply, in place of the battery 186, the electric voltage to the wheel-speed sensors 120, 122, 124, 126.

In the case where the electric voltage of the main or auxiliary power source device 180, 190 has lowered and consequently the values detected by the wheel-speed sensors 120, 122, 124, 126 have become unreliable, if those detected values are used in judging whether the vehicle is in its stopped state, it may be erroneously judged that the vehicle is in its stopped state, although the vehicle may be, in fact, running on the road. In this case, if the wheel-cylinder pressures are controlled only under the restricted upper limits, then a braking force produced by the present hydraulic brake system may be insufficiently smaller than a braking force corresponding to the stroke of depression of the brake pedal 2 by the driver. Hereinafter, this situation will be referred to as the insufficient-braking-force situation. Therefore, if the electric voltage of the main or auxiliary power source device 180, 190 has become lower than the reference value, then the wheel-cylinder pressures are controlled to the target hydraulic pressures determined based on the stroke of depression of the brake pedal 2, irrespective of the values detected by the wheel-speed sensors 120, 122, 124, 126, as indicated by the solid line in the graph of FIG. 3. In this case, the braking force produced by the present hydraulic brake system never becomes smaller than the braking force corresponding to the stroke of depression of the brake pedal 2. That is, even if it may be judged, based on the values detected by the wheel-speed sensors 120, 122, 124, 126, that the vehicle is in its stopped state, the wheel-cylinder pressures are not controlled any longer under the restricted upper limits, but the wheel-speed sensors 120, 122, 124, 126 are disabled by not utilizing the values detected by the sensors 120, 122, 124, 126. However, as far as the present application is concerned, ignoring the sensors 120, 122, 124, 126 is defined as encompassing not to utilize the values detected by the same 120, 122, 124, 126, and not to supply the electric voltage to the same 120, 122, 124, 126.

In the above-indicated case, however, the wheel-cylinder pressures may be abruptly increased from the restricted upper limits to the target hydraulic pressures determined based on the stroke of depression of the brake pedal 2. Therefore, respective large amounts of the brake liquid may flow through the pressure-increase valves 80, 82, 84, 86, which results in producing noise. In addition, when the electric voltage of the main or auxiliary power source device 180, 190 recovers to a normal level, the wheel speeds obtained based on the values detected by the sensors 120, 122, 124, 126 are again used in judging whether the vehicle is in its stopped state and, if it is judged that the vehicle is in its stopped state, then the wheel-cylinder pressures may be abruptly decreased from the high target hydraulic pressures to the low restricted upper limits. In this case, respective large amounts of the brake liquid may flow through the pressure-decrease valves 90, 92, 94, 96, which results in producing noise. In the latter case, however, the wheel-cylinder pressures are decreased at a restrained gradient, i.e., are decreased moderately, as shown in FIG. 3, and accordingly the noise produced by the brake liquid is smaller than the noise produced when the wheel-cylinder pressures are abruptly increased. In a particular case where the electric voltage of the main or auxiliary power source device 180, 190 temporarily lowers because of the cranking of the engine 182, the wheel-cylinder pressures are decreased after the cranking has ended, so that the driver or one or more passengers in the vehicle may feel discomfort.

Thus, in the present hydraulic brake system in which the values detected by the wheel-speed sensors 120, 122, 124, 126 are used to obtain the respective rotation speeds of the wheels 6, 8, 10, 12 and the thus obtained wheel speeds are used in judging whether the vehicle is in its stopped state, even if the electric voltage of the main or auxiliary power source device 180, 190 may become lower than the reference value, the wheel-cylinder pressures are not increased immediately. More specifically described, one or more conditions that can be used to estimate, based on information other than the wheel speeds, that the vehicle is in its stopped state, are employed and, if the conditions are met, i.e., it is estimated that the vehicle is in its stopped state, the wheel-cylinder pressures are controlled under the restricted upper limits; and if the conditions are not met, the wheel-cylinder pressures are not controlled under the restricted upper limits but are controlled to the target hydraulic pressures corresponding to the stroke of depression of the brake pedal 2.

The stopped state of the vehicle is opposite or inverse to the running state of the same. Therefore, a vehicle-stopped-state estimating condition can be used as a vehicle-running-state estimating condition. Thus, when the vehicle-stopped-state estimating condition is not met, i.e., when there is some possibility that the vehicle has started running or is running, the wheel-cylinder pressures are permitted to be increased to the target hydraulic pressures determined based on the stroke of depression of the brake pedal 2, so as to avoid the insufficiency of the braking force, i.e., the insufficient-brake-force situation. Thus, in the present embodiment, a condition that is used to ignore the wheel-speed sensors 120, 122, 124, 126 is constituted by two sub-conditions, i.e., the first sub-condition that the electric voltage of the main or auxiliary power source device 180, 190 becomes lower than the reference value, and the second sub-condition that the vehicle-stopped-state estimating condition is not met. Thus, the ignoring of the wheel-speed sensors 120, 122, 124, 126 are more unlikely to occur. That is, only when those two sub-conditions are met, the wheel-speed sensors 120, 122, 124, 126 are disabled as indicated by a two-dot chain line in the graph of FIG. 3. In the latter case, since the wheel-cylinder pressures are controlled under the restricted upper limits, the noise can be prevented from being generated because of the abrupt increasing and/or decreasing of the wheel-cylinder pressures, and the driver and the passengers can be prevented from feeling the discomfort.

Hereinafter, there will be described a manner in which the wheel-cylinder pressures are controlled when the vehicle is judged as being in its stopped state, by reference to the braking control routine shown in FIG. 4 and its subroutines shown in FIGS. 5 and 6. This braking control routine is iteratively implemented at prescribed short time intervals. The four identical braking control routines are provided for the four wheels 6, 8, 10, 12, respectively, but contain a common wheel-speed-sensor disabling routine shown in FIG. 5 and a common vehicle-stopped-state estimating routine shown in FIG. 6. Therefore, the four wheel-speed sensors 120, 122, 124, 126 are disabled, or are used, all at once and, as far as the disabling of the sensors 120, 122, 124, 126 is concerned, the respective wheel-cylinder pressures of the four hydraulic brakes 14, 16, 18, are controlled in the same manner, i.e., are increased or decreased under the respective restricted upper limits. Hereinafter, one of the four identical braking control routines will be described.

Figure 4:
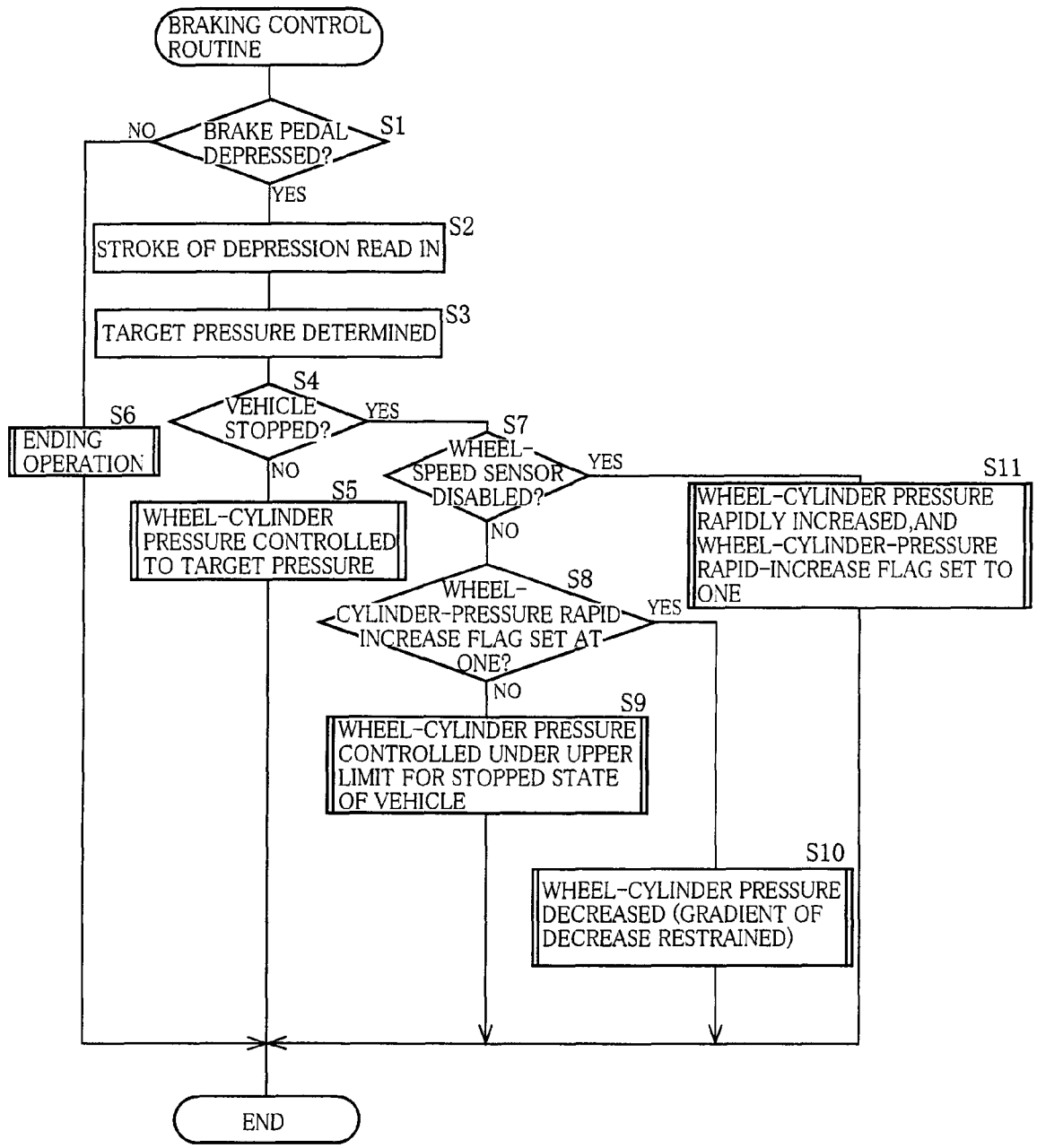
FIG. 4 is a flow chart representing a braking control routine stored in a memory of a computer as an essential component of a brake ECU (electronic control unit) that controls the hydraulic brake system.

In the present hydraulic brake system, a braking operation is carried out according to the braking control routine shown in FIG. 4. First, at Step S1 of this routine, the brake ECU 150 (or the computer thereof) judges whether the brake pedal 2 is being depressed by the driver. This judgment is made based on the detection signal outputted by the stop switch 160. If a negative judgment is made at Step S1, the control of the ECU 150 goes to Step S6 to carry out an ending operation. For example, in the case where a braking operation has been carried out before Step S6 is implemented, the supplying of electric currents to the respective solenoids of the various solenoid-operated valves is stopped so that those valves are returned to their normal states, and the pump 60 is operated so that the accumulator 62 accommodates the working liquid under pressure.

On the other hand, if a positive judgment is made at Step S1, the control of the ECU 150 goes to Step S2 to read in a stroke of depression of the brake pedal 2 that is detected by the brake-pedal-stroke sensor 152. Step S2 is followed by Step S3 to determine a target hydraulic pressure of the wheel-cylinder pressure. The target hydraulic pressure is determined based on, e.g., the detected stroke of depression of the brake pedal 2. Subsequently, the control goes to Step S4 to judge whether the vehicle is in its stopped state. This judgment is made based on respective rotation speeds of the four wheels 6, 8, 10, 12 that are detected by the four wheel-speed sensors 120, 122, 124, 126. If all the detected rotation speeds of the four wheels 6, 8, 10, 12 are equal to zero, the ECU 150 judges that the vehicle is in its stopped state. However, more strictly described, the ECU 150 judges, at Step S4, whether all the detected rotation speeds of the four wheels 6, 8, 10, 12 are lower than a threshold positive value near zero and, if a positive judgment is made, then it judges that the vehicle is in its stopped state. If a negative judgment is made at Step S4, the control goes to Step S5 to control the wheel-cylinder pressure to the target hydraulic pressure determined at Step S3. More specifically described, the actual wheel-cylinder pressure detected by the corresponding wheel-cylinder-pressure sensor 102, 104, 106, 108 is compared with the target wheel-cylinder pressure, and the corresponding pressure-increase valve 80, 82, 84, 86 and/or the corresponding pressure-decrease valve 90, 92, 94, 96 are controlled so that a difference of the actual pressure and the target pressure may be zeroed, i.e., the actual pressure agrees with the target pressure.

On the other hand, if a positive judgment is made at Step S4, the control goes to Step S7 to judge whether the four wheel-speed sensors 120, 122, 124, 126 have been disabled, i.e., judge whether a wheel-speed-sensor disablement flag, F1, has been set at one (i.e., F1=1). When the main routine is initialized, this flag F1 is reset to zero (F1=0). The flag F1 being set at one (F1=1) indicates that the sensors 120, 122, 124, 126 are disabled; and the flag F1 being reset at zero (F1=0) indicates that the sensors 120, 122, 124, 126 are not disabled, i.e., are in use. This flag F1 is set, or reset, according to a wheel-speed-sensor disabling routine shown in FIG. 5.

The wheel-speed-sensor disabling routine is for disabling the wheel-speed sensors 120, 122, 124, 126 when the electric voltage of the battery 186 of the main power-source device 180 is lower than a reference value and simultaneously when it is not estimated that the vehicle is in its stopped state. At Step S21 of this routine, the brake ECU 150 judges whether the battery 186 is ineffective, i.e., whether the voltage of the battery 186 is lower than the reference value. If the voltage of the battery 186 is not lower than the reference value and is high enough to operate the sensors 120, 122, 124, 126, then a negative judgment is made at Step S21, and the control goes to Step S22 to reset the wheel-speed-sensor disabling flag F1 to zero (F1=0).

In this case, a negative judgment is made at Step S7 of the braking control routine, and the control goes to Step S8 to judge whether a wheel-cylinder-pressure rapid-increase flag, F2, is set at one (F2=1). The flag F2 being set at one (F2=1) indicates that the wheel-speed sensors 120, 122, 124, 126 have been disabled and the wheel-cylinder pressures have been rapidly increased. If the flag F2 is set at zero (F2=0) and accordingly a negative judgment is made at Step S8, then the control goes to Step S9. In this situation, the brake pedal 2 is being depressed by the driver, the battery 186 is effective, and the vehicle is in its stopped state. Thus, at Step S9, the ECU 150 controls the wheel-cylinder pressure under the corresponding restricted upper limit, as indicated by the solid line in the graph of FIG. 3. More specifically described, at Step S9, the target hydraulic pressure determined based on the stroke of depression of the brake pedal 2 is compared with the corresponding restricted upper limit. That is, even if the target hydraulic pressure may be higher than the corresponding restricted upper limit, the wheel-cylinder pressure is controlled to not the target hydraulic pressure but the corresponding restricted upper limit. In other words, the corresponding pressure-increase and/or pressure-decrease valves are controlled according to the corresponding restricted upper limit. Thus, the wheel-cylinder pressure may be kept at the restricted upper limit. Irrespective of whether the stroke of depression of the brake pedal 2 may be large, the wheel-cylinder pressure is controlled to the restricted upper limit. On the other hand, if the target hydraulic pressure is lower than the restricted upper limit, then the wheel-cylinder pressure is controlled to the target hydraulic pressure. Thus, under the restricted upper limit, the wheel-cylinder pressure may be increased or decreased according to the stroke (amount) of depression of the brake pedal 2 by the driver.

If the voltage of the battery 186 is lower than the reference value and is too low to operate normally the wheel-speed sensors 120, 122, 124, 126, then a positive judgment is made at Step S21, and the control goes to Step S23 to judge whether it is estimated that the vehicle is in its stopped state, by judging whether a vehicle-stopped-state estimation flag, F3, is set at one (F3=1).

Figure 6:
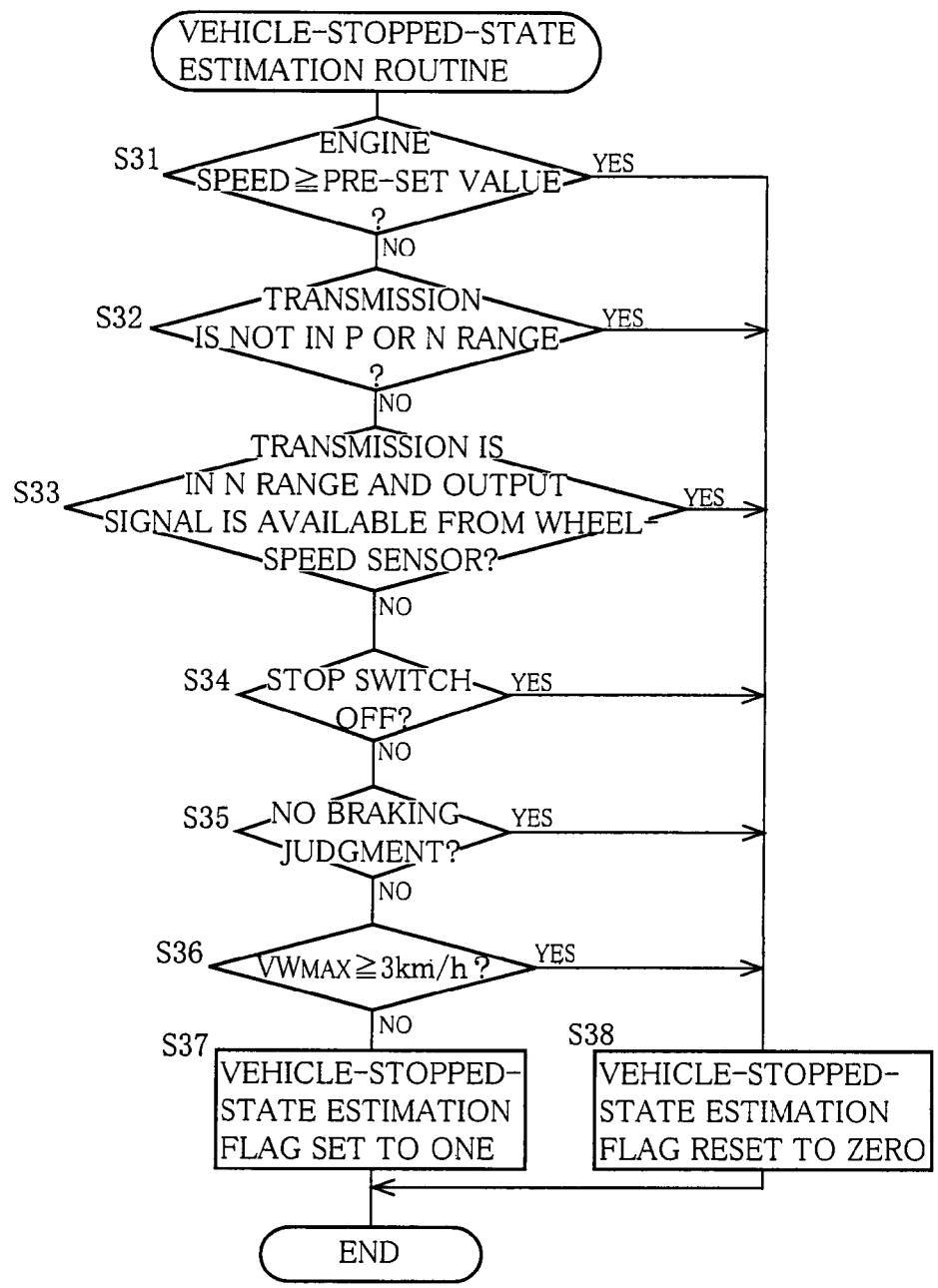
FIG. 6 is a flow chart representing a vehicle-stopped-state estimating routine stored in the memory of the computer.

The vehicle-stopped-state estimation flag F3 is set or reset according to the vehicle-stopped-state estimating routine shown in FIG. 6. In the present embodiment, the vehicle-stopped-state estimating routine employs a plurality of (e.g., six) vehicle-running-state estimating conditions and judges whether each of the six vehicle-running-state estimating conditions is satisfied. If none of the six vehicle-running-state estimating conditions is satisfied, then it is estimated that the vehicle is in its stopped state, so that the vehicle-stopped-state estimation flag F3 is set to one (F3=1). That is, if at least one of the six vehicle-running-state estimating conditions is satisfied, then it is not estimated that the vehicle is in its stopped state, so that the estimation flag F3 is reset to zero (F3=0).

In the present brake control apparatus, the six vehicle-running-state estimating conditions are as follows: (A) a first condition that a rotation speed of the engine 182 is not lower than a pre-set value, i.e., the engine 182 is, after cranking, ready for starting running; (B) a second condition that an operation range (or position) of a transmission of the vehicle is not at a P (parking) range or an N (neutral) range; (C) a third condition that the operation range of the transmission is at the N range, and detection signals (i.e., pulses) are available from all the wheel-speed sensors 120 through 126; (D) a fourth condition that the detection signal of the stop switch 160 is the OFF signal; (E) a fifth condition that there are no braking judgments (i.e., the master-cylinder pressure and the operation stroke of the brake pedal 2 are lower or smaller than respective pre-set values; and (F) a sixth condition that the highest one, $VW_{MAX}$, of the respective wheel speeds obtained based on the respective detection signals of the four wheel-speed sensors 120 through 126 is not lower than a pre-set value (e.g., 3 km/h). Which operation range (or position) is currently taken by the transmission can be known from the information supplied from the engine ECU 166. The rotation speed of the engine 182 is detected by an engine-speed sensor (not shown) that is employed for controlling the engine 182, and the engine speed detected by the engine-speed sensor is supplied to the brake ECU 150 via the engine ECU 166.

The above-described six vehicle-running-state estimating conditions (A) through (F) are judged at Steps S31 through S36 of the vehicle-stopped-state estimating routine of FIG. 6, respectively. If at least one of the six vehicle-running-state estimating conditions (A) through (F) is satisfied, i.e., if a positive judgment is obtained at least one of Steps S31 through S36, the control goes to Step S38 to reset the vehicle-stopped-state estimation flag F3 to zero (F3=0). On the other hand, if none of the six vehicle-running-state estimating conditions (A) through (F) is satisfied, i.e., if a negative judgment is obtained at each of Steps S31 through S36, the control goes to Step S37 to set the vehicle-stopped-state estimation flag F3 to one (F3=1). The fact that at least one of the six vehicle-running-state estimating conditions (A) through (F) is satisfied means that there is some possibility that the vehicle may be running or be about to run, and the fact that none of the six vehicle-running-state estimating conditions (A) through (F) is satisfied means that there is no possibility that the vehicle may be running or be about to run, i.e., allows an estimation that the vehicle is in its stopped state.

If it is estimated that the vehicle is in its stopped state and the vehicle-stopped-state estimation flag F3 is set to one (F3=1), then a positive judgment is made at Step S23 of the wheel-speed-sensor disabling routine, and the control goes to Step S22 to reset the wheel-speed-sensor disablement flag F1 to zero (F1=0). Therefore, a negative judgment is made at Step S7 of the braking control routine, and the control goes to Step S8. If the wheel-cylinder-pressure rapid-increase flag F2 has not been set at one (F2=1), i.e., if the flag F2 has been set at zero (F2=0) and accordingly a negative judgment is made at Step S8, then the control goes to Step S9. In this case, the battery 186 is ineffective, but the vehicle is estimated to be in its stopped state. Therefore, the wheel-cylinder pressure is controlled under the restricted upper limit. That is, as indicated by the two-dot chain line in the graph shown in FIG. 3, the upper limit of the wheel-cylinder pressure remains restricted. If the lowering of the voltage of the battery 186 is just temporary, then a time duration in which the wheel-speed-sensor disabling routine judges that the power source is ineffective is short. Therefore, there is little possibility that in that short time duration, the running state of the vehicle is estimated and the wheel-speed sensor 120 through 126 is disabled. In the present embodiment, since the stopped state of the vehicle is estimated based on one or more predetermined conditions, the wheel-cylinder pressure can be effectively prevented from being uselessly increased.

On the other hand, if it is not estimated that the vehicle is in its stopped state, i.e., if it is estimated that the vehicle is in its running state or its running-starting state, and the vehicle-stopped-state estimation flag F3 is set at zero (F3=0), then a negative judgment is made at Step S23 of the wheel-speed-sensor disabling routine, and the control goes to Step S24 to set the wheel-speed-sensor disablement flag F1 to one (F1=1). Therefore, a positive judgment is made at Step S7 of the braking control routine, and the control goes to Step S11. At Step S11, as indicated by solid line in the graph shown in FIG. 3, the wheel-cylinder pressure is rapidly increased to a value corresponding to the operation stroke of the brake pedal 2. Accordingly, a large braking force can be obtained and, even if the vehicle may be in its running state or its running-starting state, the insufficiency of the braking force can be prevented. At Step S11, the wheel-cylinder-pressure rapid-increase flag F2 is set to one (F2=1).

At Step S11, the wheel-cylinder pressure is increased while the gradient of increase of the wheel-cylinder pressure is restrained. More specifically described, the wheel-cylinder pressure is increased by an incremental amount, $\Delta Pi$, each time the braking control routine is implemented, i.e., one pressure-increase command is outputted at Step S11. This incremental amount $\Delta Pi$ is pre-set such that the gradient of increase of the wheel-cylinder pressure that is restrained using the pre-set incremental amount $\Delta Pi$ is smaller than the gradient of increase of the wheel-cylinder pressure that is not restrained using the pre-set incremental amount $\Delta Pi$, i.e., that occurs when the pressure-increase valve 80 through 86 is opened to increase the wheel-cylinder pressure from the restricted upper limit of the wheel-cylinder pressure to the target pressure determined based on the operation stroke of the brake pedal 2 and thereby zero the difference of the target pressure and the actual wheel-cylinder pressure. To this end, an electric current to be supplied to the pressure-increase valve 80 through 86 so as to obtain the pre-set incremental amount $\Delta Pi$, is calculated and outputted by the brake ECU 150. Each time one pressure-increase command is outputted at Step S11, i.e., each time the wheel-cylinder pressure is increased according to the one command, the difference of the target pressure, Pp, determined based on the operation stroke of the brake pedal 2, and the actual wheel-cylinder pressure is decreased by the pre-set incremental amount $\Delta Pi$, while the actual wheel-cylinder pressure is increased from the restricted upper limit, Ps, of the wheel-cylinder pressure, at the gradient restrained by the pre-set incremental amount $\Delta Pi$. That is, the actual wheel-cylinder pressure is repeatedly increased toward the target pressure Pp, till the difference of the target pressure Pp and the actual wheel-cylinder pressure (Ps+n·$\Delta Pi$; n is a number of pressure-increase commands or actions) is decreased to zero. The difference of the target pressure Pp and the actual wheel-cylinder pressure, gradually decreased by the pressure-increase actions, is repeatedly compared with the incremental amount $\Delta Pi$, and an amount of increase of the wheel-cylinder pressure for the last pressure-increase action is determined to be equal to a value obtained by subtracting, from the target pressure Pp, the actual wheel-cylinder pressure (Ps+n·$\Delta Pi$), when the following expression is first satisfied:

$$Pp-(Ps+n\cdot\Delta Pi) \leq \Delta Pi$$

The wheel-cylinder pressure is controlled to be equal to the target pressure in the last pressure-increase action, and the current pressure-increasing operation is finished.

At Step S11, the pressure-increase actions wherein the gradient of increase of the wheel-cylinder pressure is restrained are permitted and, when the wheel-cylinder pressure reaches the target pressure, the wheel-cylinder pressure is kept at the target pressure. Subsequently, if the brake pedal 2 is further operated or depressed, the wheel-cylinder pressure is increased. In this case, too, the gradient of increase of the wheel-cylinder pressure is restrained. At Step S11, the wheel-cylinder pressure may be decreased. More specifically described, if the brake pedal 2 is returned back to some degree, the wheel-cylinder pressure is decreased. When the wheel-cylinder pressure is decreased, the gradient of decrease of the wheel-cylinder pressure is also restrained. If the difference of the target pressure Pp and the actual wheel-cylinder pressure Pa is larger than a pre-set decremental amount, ΔPd, the actual wheel-cylinder pressure Pa is decreased at a gradient defined by the pre-set decremental amount ΔPd. Although the pressure-decrease actions wherein the gradient of decrease of the wheel-cylinder pressure is restrained will be described later, the decremental amount ΔPd may be equal to a decremental amount that is used in a pressure-decreasing operation, carried out at Step S10 (described later), wherein the gradient of decrease of the wheel-cylinder pressure is restrained. Thus, the wheel-cylinder pressure is moderately decreased, and the generation of noise is reduced. If the degree of operation of the brake pedal 2 by the driver does not need the restraining of the gradient of increase or decrease of the wheel-cylinder pressure, the wheel-cylinder pressure is increased or decreased at a gradient corresponding to the degree of operation of the brake pedal 2.

Thus, even if the wheel-speed sensor 120 through 126 may have been disabled, i.e., the wheel-cylinder pressure may have been increased, the cranking of the engine 182 may end and accordingly the voltage of the battery 186 may increase again, so that a sufficiently high electric voltage may be supplied to the wheel-speed sensor 120 through 126. In this case, a negative judgment is made at Step S21 of the wheel-speed-sensor disabling routine and the control goes to Step S22 to reset the wheel-speed-sensor disablement flag F1 to zero (F1=0), i.e., enable the wheel-speed sensor 120 through 126. If the voltage of the battery 186 is higher than the pre-set value and a sufficiently high voltage is supplied to the wheel-speed sensor 120 through 126, then a reliable wheel speed can be detected by the sensor 120 through 126. In this case, if it is judged based on the reliable wheel speed that the vehicle is in its stopped state, the restriction to the upper limit of the wheel-cylinder pressure can be permitted.

If the wheel-speed-sensor disablement flag F1 is set to one (F1=1) and then is reset to zero (F1=0), Step S7 of the braking control routine first provides a positive judgment and then provides a negative judgment, so that the control goes to Step S8. In this case, since the wheel-speed sensor 120 through 126 has been disabled, and the wheel-cylinder pressure has been increased and the wheel-cylinder-pressure rapid-increase flag F2 has been set at one (F2=1), at Step S11, a positive judgment is made at Step S8, so that the control goes to Step S10 to decrease the wheel-cylinder pressure toward the restricted upper limit of the wheel-cylinder pressure. More specifically described, as shown in the graph of FIG. 3, the wheel-cylinder pressure is decreased at a restrained, moderate gradient, and accordingly the generation of noise is reduced. This gradient of decrease is pre-set. In the present brake control apparatus, the wheel-cylinder pressure is decreased by a decremental amount ΔPd, each time the brake control routine is implemented, i.e., one pressure-decrease command is outputted at Step S10. This decremental amount ΔPd is pre-set at such a positive value that the gradient of decrease of the wheel-cylinder pressure that is restrained using the pre-set decremental amount ΔPd is smaller than the gradient of decrease of the wheel-cylinder pressure that is not restrained using the decremental amount ΔPd, i.e., that occurs when the pressure-decrease valve 90 through 96 is opened to decrease the wheel-cylinder pressure and thereby zero the difference of the actual wheel-cylinder pressure and the restricted upper limit Ps of the wheel-cylinder pressure. To this end, an electric current to be supplied to the pressure decrease valve 90 through 96 so as to obtain the pre-set decremental amount ΔPd, is calculated and outputted by the brake ECU 150. Each time one pressure-decrease command is outputted at Step S10, i.e., each time the wheel-cylinder pressure is decreased according to the one command, the difference of the restricted upper limit Ps of the wheel-cylinder pressure and the actual wheel-cylinder pressure is decreased by the pre-set decremental amount ΔPd, while the actual wheel-cylinder pressure is decreased from the initial pressure Pa, at the restrained, moderate gradient defined by the pre-set decremental amount ΔPd.

That is, the actual wheel-cylinder pressure is repeatedly decreased, at Step S10, toward the restricted upper limit Ps of the wheel-cylinder pressure, till the difference of the restricted upper limit Ps and the actual wheel-cylinder pressure (Pa−n·ΔPd; n is a number of pressure-decrease commands or actions) is decreased to zero. The pressure Pa is the actual wheel-cylinder pressure that is detected when the first pressure-decrease action is started at Step S10, and is stored in the memory of the brake ECU 150. The difference of the restricted upper limit Ps of the wheel-cylinder pressure and the actual wheel-cylinder pressure, gradually decreased by the pressure-decrease actions, is repeatedly compared with the decremental amount ΔPd, and an amount of decrease of the wheel-cylinder pressure for the last pressure-decrease action is determined to be equal to an absolute value of a value obtained by subtracting, from the restricted upper limit Ps of the wheel-cylinder pressure, the actual wheel-cylinder pressure (Pa−n·ΔPd), when the following expression is first satisfied:

$$|Ps-(Pa-n \cdot \Delta Pd)| \leq \Delta Pd$$

The wheel-cylinder pressure is decreased to the restricted upper limit Ps of the wheel-cylinder pressure in the last pressure-decrease action, and the current pressure-decreasing operation is finished. In addition, the wheel-cylinder-pressure rapid-increase flag F2 is reset to zero (F2=0). Then, when the vehicle is in its stopped state, Steps S7 through S9 are carried out so as to control the wheel-cylinder pressure under the restricted upper limit Ps thereof. The wheel-cylinder-pressure rapid-increase flag F2 is also reset to zero (F2=0) when an ending operation is carried out at Step S6, or when Step S5 is carried out after a negative judgment is made at Step S4.

Even in the case where the lowering of the voltage of the battery 186 is not temporary, if the running state of the vehicle is estimated, then the control goes to Step S24 to set the wheel-speed-sensor disablement flag F1 to one (F1=1). Consequently a positive judgment is made at Step S7, and the control goes to Step S11. Thus, the restriction to the upper limit of the wheel-cylinder pressure can be removed, as needed, so as to increase the wheel-cylinder pressure.

As is apparent from the foregoing description of the first embodiment of the brake control apparatus, a portion of the brake ECU 150 that carries out Step S4 provides a vehicle-stopped-state detecting portion; a portion of the brake ECU 150 that carries out Step S9 provides a hydraulic-pressure limiting portion as a brake-operation-force limiting portion; and a portion of the brake ECU 150 that carries out Step S10 provides a gradient restraining portion. In addition, a portion of the brake ECU 150 that carries out Step S21 provides a detecting portion that detects that a power source is ineffective; a portion of the brake ECU 150 that carries out Step S23 cooperates with the detecting portion to provide a sensor-disablement judging portion as a sensor-ignoring judging portion; a portion of the brake ECU 150 that carries out Step S24 provides a sensor ignoring (disabling) portion; and a portion of the brake ECU 150 that carries out Step S1 provides a limitation canceling portion. Moreover, a portion of the brake ECU 150 that carries out Steps S31 through S36 provides a vehicle-stopped-state estimating portion; a portion of the brake ECU 150 that carries out Step S22 provides a limitation-canceling inhibiting portion; and the vehicle-stopped-state estimating portion and the limitation-canceling inhibiting portion cooperate with each other to provide a rapid-change restraining portion or a hydraulic-pressure rapid-change restraining portion.

Figure 5:
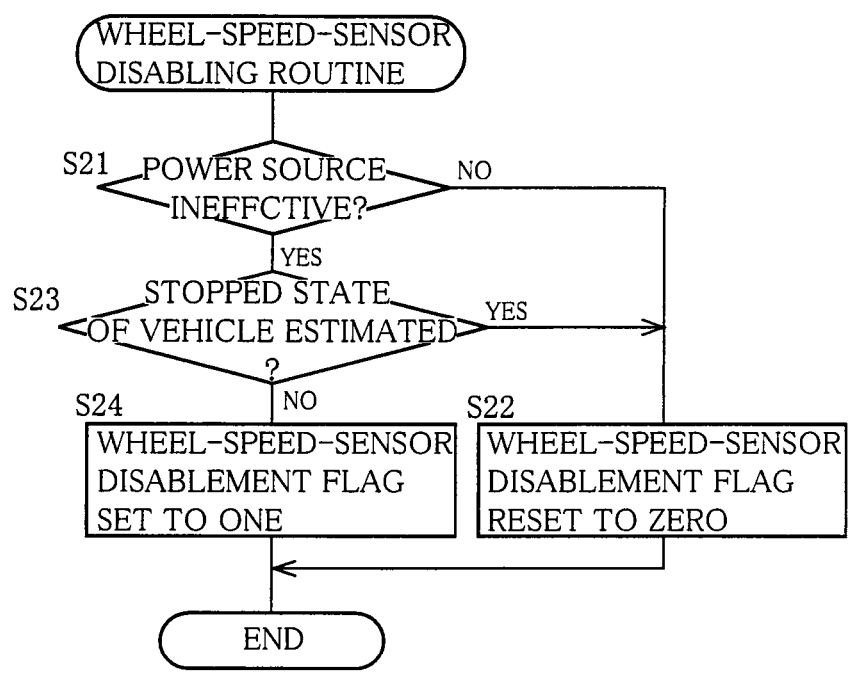
FIG. 5 is a flow chart representing a wheel-speed-sensor disabling routine stored in the memory of the computer.

Meanwhile, in the wheel-speed-sensor disabling routine of FIG. 5, Step S23 to judge whether the stopped state of the vehicle is estimated may precede Step S21 to judge whether the power source is ineffective. In this case, if the stopped state of the vehicle is estimated at Step S23, then Step S22 is carried out; and if not, Step S21 is carried out to judge whether the power source is ineffective. If the power source is ineffective, Step S24 is carried out.

The rapid change of the operation force of the brake, caused by the cancellation of the limitation to the operation force, may be restrained by restraining at least one of a gradient of increase, and a gradient of decrease, of the operation force. This feature is embodied as a second embodiment shown in FIGS. 7 and 8. The second embodiment differs from the first embodiment shown in FIGS. 1 through 6, only in that the second embodiment employs a braking control routine of FIG. 7 in place of the braking control routine of FIG. 4.

In the present brake control apparatus, if the battery 186 of the main power source device 180 deteriorates, the voltage of the battery 186 lowers to a value not higher than a pre-set value during cranking of the engine 182, and the power source is judged as being ineffective, then the wheel-cylinder pressure is increased based on the stroke of depression of the brake pedal 2. However, as indicated by a two-dot chain line in a graph shown in FIG. 8, a gradient of increase of the wheel-cylinder pressure is restrained to be low, so that the wheel-cylinder pressure may not be rapidly changed. More specifically described, since the wheel-speed sensor 120 through 126 is disabled, the wheel-cylinder pressure is increased without the upper limit, but the gradient of increase of the wheel-cylinder pressure is restrained. Meanwhile, if the cranking ends, the voltage of the battery 186 increases to be higher than the pre-set value, the power source is judged as being effective, and the wheel speed obtained based on the detection signal produced by the wheel-speed sensor 120 through 126 turns to be reliable, then the wheel-cylinder pressure is decreased to the upper limit of the wheel-cylinder pressure for the stopped state of the vehicle. A gradient of this decrease of the wheel-cylinder pressure is restrained in the same manner as the manner employed in the first embodiment.

Hereinafter, there will be described the manners in which the gradient of increase, and the gradient of decrease, of the wheel-cylinder pressure are restrained when the power source is judged as being ineffective during the cranking of the engine 182, by reference to the braking control routine shown in FIG. 7.

Figure 7:
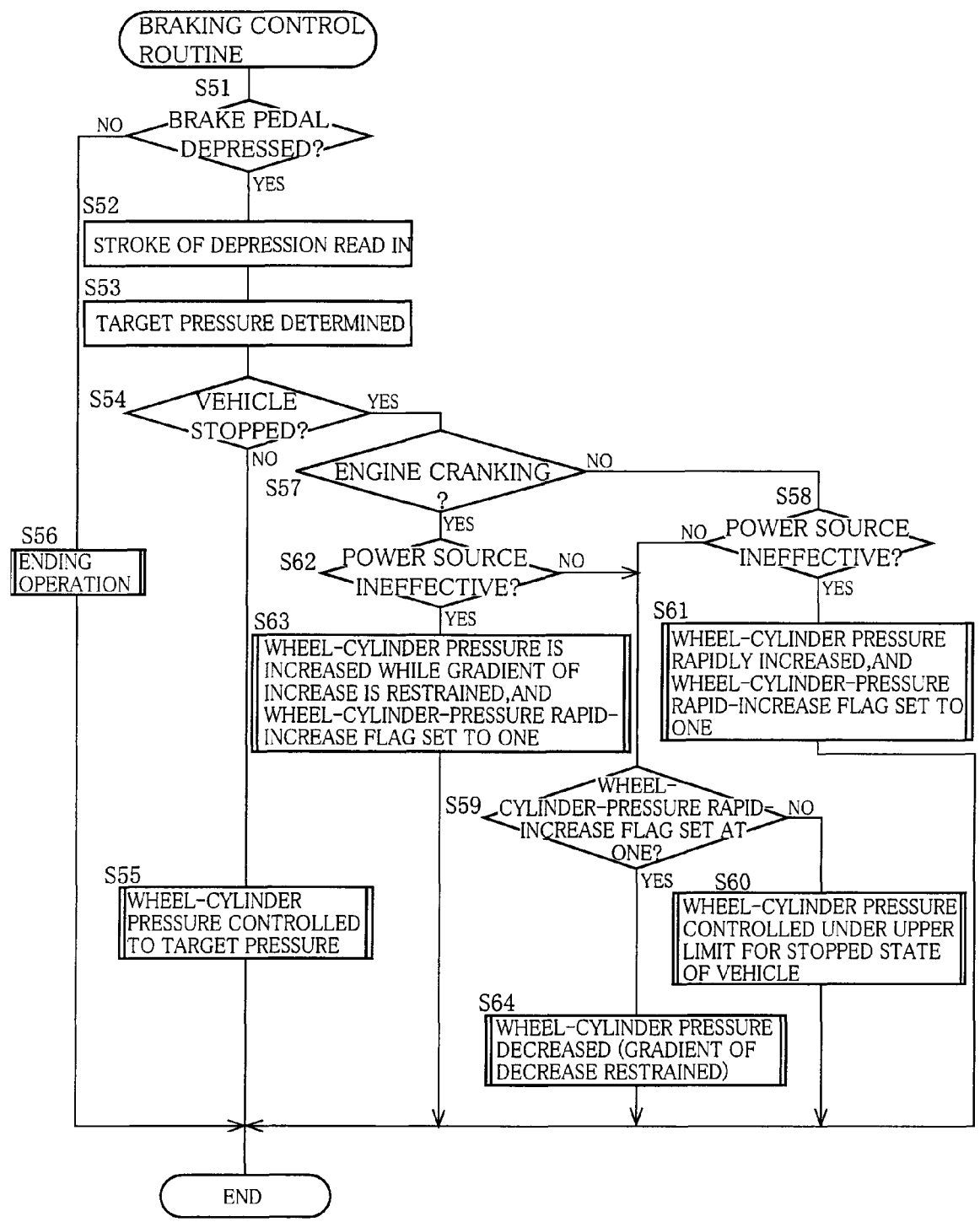
FIG. 7 is a flow chart representing another braking control routine stored in a memory of a computer as an essential component of a brake ECU that controls another hydraulic brake system including another brake control apparatus as a second embodiment of the present invention.

Steps S51 through S56 of FIG. 7 are identical with Steps S1 through S6 of FIG. 4, respectively, and the description thereof is omitted. If the stopped state of the vehicle is judged and accordingly a positive judgment is made at Step S54, the control goes to Step S57 to judge whether the engine 182 is cranking. This judgment may be made based on a rotation speed of the engine 182. An engine-speed sensor (not shown) is employed for the purpose of controlling the engine 182, and the rotation speed of the engine 182, detected by the engine-speed sensor, is supplied to the brake ECU 150 via the engine ECU 166. At Step S57, it is judged whether the detected rotation speed of the engine 182 is not lower than a first pre-set speed and not higher than a second pre-set speed higher than the first pre-set speed. Since the rotation speed of the engine 182 is low during cranking thereof, the first speed is pre-set to be lower than the second speed, and the first and second speeds are pre-set such that if the detected rotation speed of the engine 182 is not lower than the first pre-set speed and not higher than the second pre-set speed, it can be judged that the engine 182 is cranking.

If the detected rotation speed of the engine 182 is lower than the first pre-set speed or higher than the second pre-set speed, i.e., if the vehicle is in its stopped state before cranking of the engine 182, or the vehicle is ready, after cranking, for starting running, a negative judgment is made at Step S57 and the control goes to Step S58 to judge whether the power source is ineffective, i.e., whether the voltage of the battery 186 is not higher than a pre-set value. If the voltage of the battery 186 is higher than the pre-set value and accordingly the power source is judged as being effective, i.e., a negative judgment is made at Step S58, then the control goes to Step S59 to judge whether the wheel-cylinder-pressure rapid-increase flag F2 is set at one (F2=1). If the wheel-cylinder-pressure has not been increased from the restricted upper limit of the wheel-cylinder-pressure, before the negative judgment is obtained at Step S58, and accordingly the rapid-increase flag F2 is not set at one (F2=1), i.e., is reset at zero (F2=0), then a negative judgment is made at Step S59, and the control goes to Step S60 that is identical with Step S9 of FIG. 4. That is, at Step S60, the ECU 150 controls the wheel-cylinder pressure under the restricted upper limit thereof. On the other hand, if the power source is judged as being ineffective, i.e., a positive judgment is made at Step S58, then the control goes to Step S61 that is identical with Step S11 of FIG. 4. That is, at Step S61, the ECU 150 permits the wheel-cylinder pressure to be increased, while the ECU 150 restrains the gradient of increase of the wheel-cylinder pressure, and additionally sets the wheel-cylinder-pressure rapid-increase flag F2 to one (F2=1).

On the other hand, if the engine 182 is cranking, i.e., if a positive judgment is made at Step S57, then the control goes to Step S62 that is identical with Step S58. That is, at Step S62, the ECU 150 judges whether the power source is ineffective. Even if the engine 182 may be cranking, the voltage of the battery 186 is not necessarily low. If the voltage of the battery 186 is sufficiently high, a negative judgment is made at Step S62, and the control goes to Step S59 to judge whether the wheel-cylinder-pressure rapid-increase flag F2 is set at one (F2=1). If a negative judgment is made at Step S59, then the control goes to Step S60 to control the wheel-cylinder pressure under the restricted upper limit thereof.

If the power source is judged as being ineffective during cranking of the engine 182, then a positive judgment is made at each of Steps S57 and S62, and the control goes to Step S63 to control the wheel-cylinder pressure according to the stroke of depression of the brake pedal 2. During this pressure-increasing operation, the gradient of increase of the wheel-cylinder pressure is restrained and accordingly the wheel-cylinder pressure is more moderately increased than the usual pressure-increasing operation in which the gradient of increase is not restrained at all. Therefore, the flowing of the brake liquid can be restrained and accordingly one or more passengers in the vehicle can be prevented from feeling discomfort upon hearing of sounds caused by the flowing of the brake liquid. At Step S63, the wheel-cylinder-pressure rapid-increase flag F2 is set to one (F2=1), indicating that the wheel-cylinder pressure is increased from the restricted upper limit thereof.

At Step S63, the gradient of increase of the wheel-cylinder pressure is restrained in the same manner as the manner employed at Step S11 of FIG. 4. More specifically described, the wheel-cylinder pressure is increased by an incremental amount $\Delta Pi$ each time one pressure-increase command is outputted at Step S63. This incremental amount $\Delta Pi$ is pre-set such that the gradient of increase of the wheel-cylinder pressure that is restrained using the pre-set incremental amount $\Delta Pi$ is smaller than the gradient of increase of the wheel-cylinder pressure that is not restrained at all. However, the incremental amount $\Delta Pi$ used at Step S63 is smaller than incremental amount $\Delta Pi$ used at Step S11. Thus, as indicated by the two-dot chain line in the graph of FIG. 8, the wheel-cylinder pressure is more moderately increased from the restricted upper limit Ps thereof, at the restrained gradient. At Step S63, the wheel-cylinder pressure may be decreased. More specifically described, if the brake pedal 2 is returned back to some degree in a state in which the engine 182 is cranking and the power source is ineffective, the wheel-cylinder pressure is decreased in the same manner as the manner employed at Step S11 of FIG. 4. That is, the wheel-cylinder pressure is decreased while the gradient of decrease of the wheel-cylinder pressure is restrained.

If the judgment about the ineffective state of the power source is changed from a positive one to a negative one during the cranking of the engine 182, then a negative judgment is made at Step S62 and a positive judgment is made at Step S59, so that the control goes to Step S64 that is identical with Step S10 of FIG. 4. That is, at Step S64, the wheel-cylinder pressure is decreased while the gradient of decrease of the wheel-cylinder pressure is restrained. Also in the case where the judgment about the ineffective state of the power source is changed from a positive one to a negative one after the cranking of the engine 182, the control goes to Step S64 because a negative judgment is made at each of Steps S57 and S58 and a positive judgment is made at Step S59. As indicated by the two-dot chain line in the graph of FIG. 8, during the time duration in which the power source is ineffective, the wheel-cylinder pressure is increased at the restrained gradient of increase; and when the power source is turned effective, the wheel-cylinder pressure is decreased, at the restrained gradient of decrease, from the pressure at that time.

In the case where the ineffective state of the power source results from a different cause than the cranking of the engine 182, the power source is not turned effective even if the cranking may end. In this case, however, a negative judgment is made at Step S57 and a positive judgment is made at Step S58, so that the control goes to Step S61 to increase the wheel-cylinder pressure according to the stroke of depression of the brake pedal 2. Therefore, there is no possibility that the braking force becomes insufficiently low. At Step S61, the wheel-cylinder pressure may be increased at the same gradient as the gradient used at Step S63.

As is apparent from the foregoing description of the second embodiment of the brake control apparatus, a portion of the brake ECU 150 that carries out Step S57 provides a cranking detecting portion; a portion of the brake ECU 150 that carries out Step S60 provides a hydraulic-pressure limiting portion as a brake-operation-force limiting portion; a portion of the brake ECU 150 that carries out Step S58 or S62 provides a detecting portion that detects that the power source is ineffective, or a sensor ignoring (disabling) portion; a portion of the brake ECU 150 that carries out Step S61 provides a limitation (or restriction) canceling portion; and a portion of the brake ECU 150 that carries out Step S63 or S64 provides a gradient restraining portion.

The rapid change of the operation force of the brake, caused by the cancellation of the limitation (or restriction) to the operation force, may be restrained by controlling the wheel-cylinder pressure under a second upper limit (i.e., a second restricted value) of the wheel-cylinder pressure for the ineffective state of the power source and is somewhat higher than the above-described, i.e., first upper limit (i.e., a first restricted value) of the wheel-cylinder pressure for the stopped state of the vehicle. This feature is embodied as a third embodiment shown in FIGS. 9 and 10.

Figure 8:
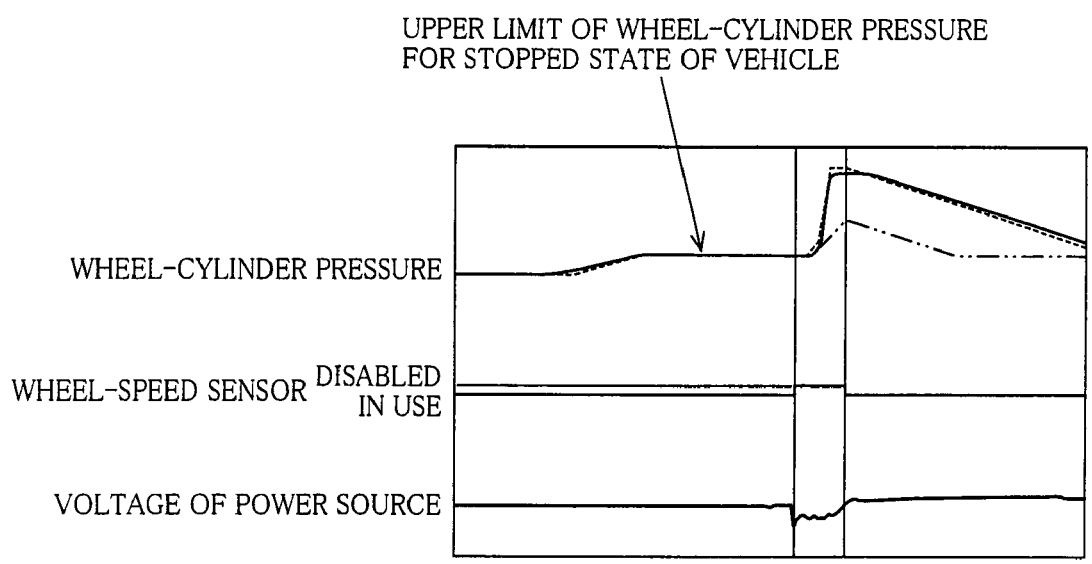
FIG. 8 is a graph for explaining a manner in which the brake control apparatus controls a wheel-cylinder pressure according to the braking control routine of FIG. 7.
Figure 9:
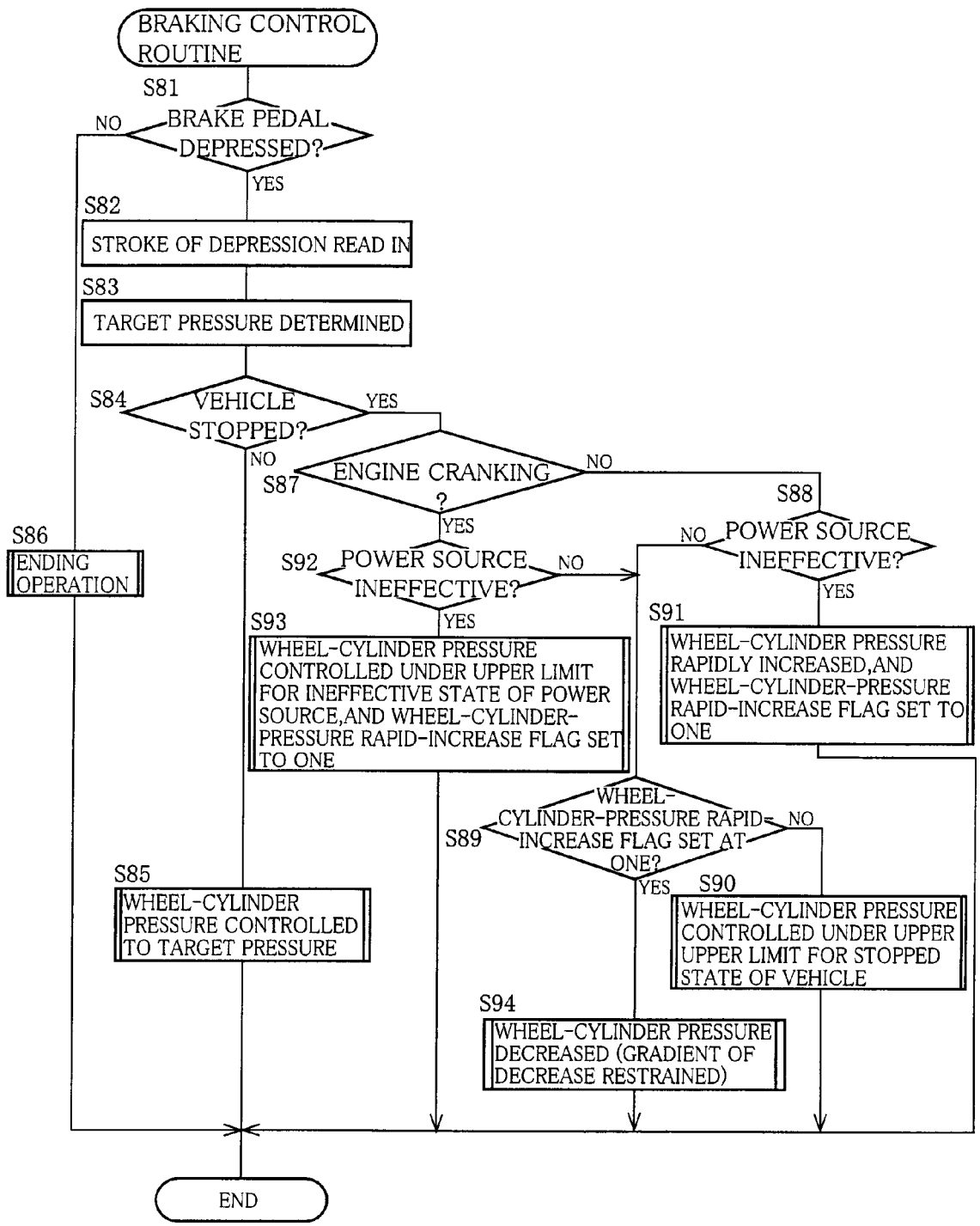
FIG. 9 is a flow chart representing another braking control routine stored in a memory of a computer as an essential component of a brake ECU that controls another hydraulic brake system including another brake control apparatus as a third embodiment of the present invention.
Figure 10:
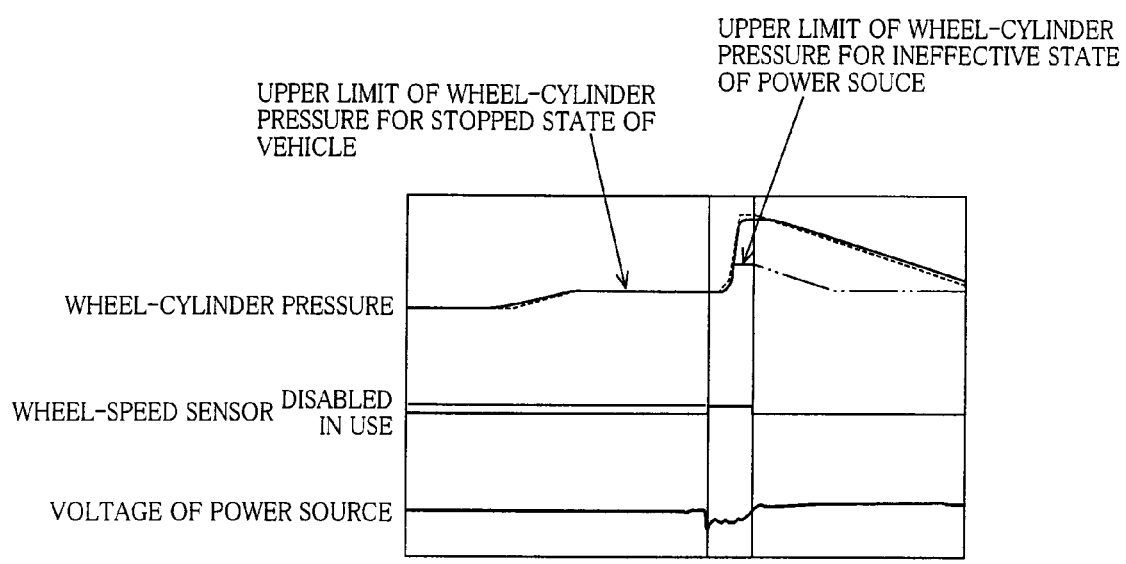
FIG. 10 is a graph for explaining a manner in which the brake control apparatus controls a wheel-cylinder pressure according to the braking control routine of FIG. 9.

The third embodiment differs from the second embodiment shown in FIGS. 7 and 8, only in that the third embodiment employs, in place of the braking control routine of FIG. 7, a braking control routine of FIG. 9 in which Steps S81 through S92 and S94 are identical with Steps S51 through S62 and S64, respectively, and only Step S93 replaces Step S63. At Step S93, the brake ECU 150 controls the wheel-cylinder pressure under the second upper limit of the wheel-cylinder pressure that is used when the power source is ineffective.

In the present brake control apparatus, if it is judged based on the output signal of the wheel-speed sensor 120 through 126 that the vehicle is in its stopped state, and if the engine 182 is cranking and the power source is ineffective, then a positive judgment is made at each of Steps S84, S87, and S92 and accordingly the control goes to Step S93 to increase the wheel-cylinder pressure. However, the brake ECU 150 controls the wheel-cylinder pressure under not the first upper limit thereof for the stopped state of the vehicle but the second upper limit thereof for the ineffective state of the power source. As indicated by a two-dot chain line in a graph of FIG. 10, the second upper limit of the wheel-cylinder pressure for the ineffective state of the power source is somewhat higher than the first upper limit of the wheel-cylinder pressure for the stopped state of the vehicle. The target pressure determined based on the stroke of depression of the brake pedal 2 is compared with the second upper limit of the wheel-cylinder pressure and, if the target pressure is higher than the second upper limit, then the wheel-cylinder pressure is controlled to the second upper limit. That is, as indicated by the two-dot chain line in the graph of FIG. 10, the wheel-cylinder pressure is controlled under the second upper limit. Thus, the wheel-cylinder pressure is prevented from being rapidly increased and accordingly noise is prevented from being generated by flowing of a large amount of the brake liquid. At Step S93, the wheel-cylinder-pressure rapid-increase flag F2 is set to one (F2=1). Thus, at Step S93, the upper limit of the wheel-cylinder pressure is also restricted. However, if the target pressure determined based on the stroke of depression of the brake pedal 2 is lower than the second upper limit of the wheel-cylinder pressure, the wheel-cylinder pressure is controlled to the target pressure. At Step S93, the wheel-cylinder pressure may be decreased according to a degree of returning of the brake pedal 2 by the driver.

Meanwhile, if the power source is turned effective in the state in which the wheel-cylinder pressure is controlled under the second upper limit, then a negative judgment is made at Step S92 and accordingly the control goes to Steps S89 and S94 to decrease the wheel-cylinder pressure at the restrained gradient to the first upper limit of the wheel-cylinder pressure for the stopped state of the vehicle.

In the case where the lowering of the voltage of the power source is not due to the cranking of the engine 182, the power source is not turned effective even if the cranking may end. In this case, a positive judgment is made at Step S88 and the control goes to Step S91 that is identical with Step S11 of FIG. 4. That is, the wheel-cylinder pressure is allowed to be increased while the gradient of increase thereof is restrained, so that the wheel-cylinder pressure may be increased to the target pressure corresponding to the stroke of depression of the brake pedal 2. In this case, since the limitation to the wheel-cylinder pressure, caused by the lowering of the voltage of the power source, is canceled, a sufficiently high braking force can be obtained.

In the present embodiment, a portion of the brake ECU 150 that carries out Step S93 provides a restricted-value changing portion as a brake-operation-force-increase restraining portion.

When the wheel-speed sensor 120 through 126 is ignored based on the ineffective state of the power source and accordingly the limitation (or restriction) to the operation force of the brake 14 through 20 by the brake-operation-force limiting portion is canceled, it is possible to restrain, using a low-pass filter, the rapid change of the operation force, i.e., the wheel-cylinder pressure. This feature is embodied as a fourth embodiment shown in FIGS. 11 and 12.

Figure 11:
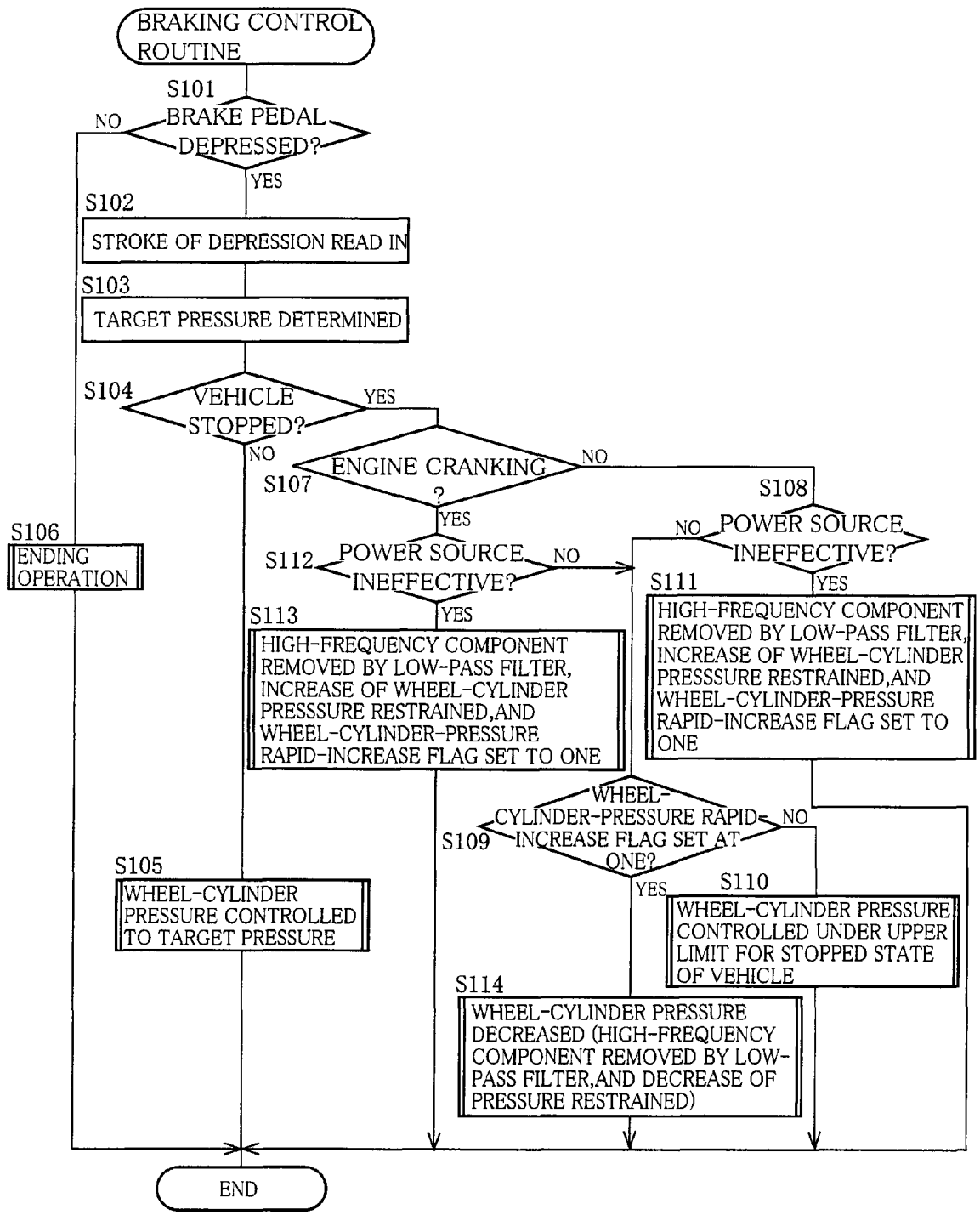
FIG. 11 is a flow chart representing another braking control routine stored in a memory of a computer as an essential component of a brake ECU that controls another hydraulic brake system including another brake control apparatus as a fourth embodiment of the present invention.

The fourth embodiment differs from the second embodiment shown in FIGS. 7 and 8 only in that the fourth embodiment employs, in place of the braking control routine of FIG. 7, a braking control routine of FIG. 11 in which Steps S101 through S110 and S112 are identical with Steps S51 through S60 and S62, respectively, and only Steps S111, S113, and S114 replace Steps S61, S63, and S64, respectively.

Figure 12:
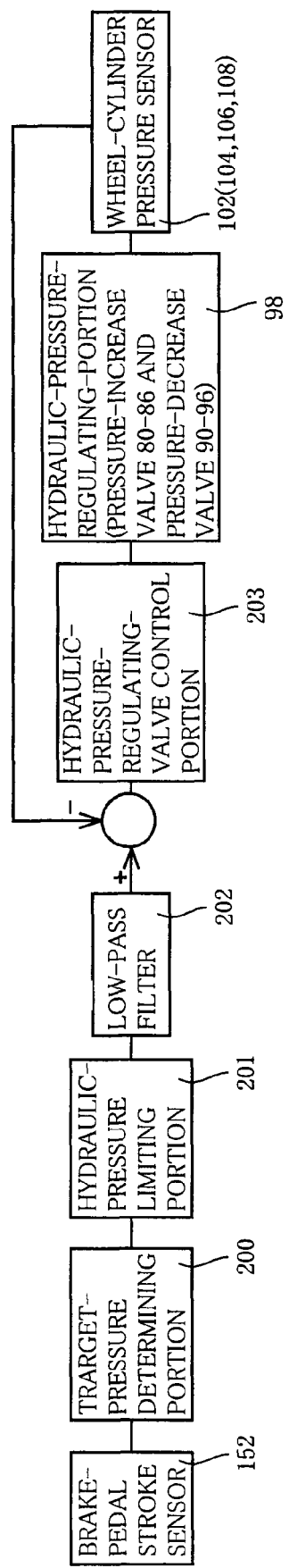
FIG. 12 is a diagrammatic view of various functions needed to control, when a vehicle is in its stopped state, a wheel-cylinder pressure according to the braking control routine of FIG. 11.

FIG. 12 is a diagrammatic view of various functions of the present brake control apparatus that are used to control the wheel-cylinder pressure.

A target-pressure determining portion 200 determines a target pressure based on the stroke of depression of the brake pedal 2 that is detected by the brake-pedal stroke sensor 152. When the vehicle is running, the thus determined target pressure is supplied to a low-pass filter 202 without being restricted or limited by a hydraulic-pressure limiting portion 201. On the other hand, when the vehicle is in its stopped state, the thus determined target pressure is supplied to the low-pass filter 202 with, or without, the limitation by the hydraulic-pressure limiting portion 201, so that a high-frequency component may be removed from the target pressure. Thus, a hydraulic-pressure-regulating-valve control portion 203 obtains a control pressure as a control target for the corresponding pressure-increase valve 80 through 86 and the corresponding pressure-decrease valves 90 through 96 of the hydraulic-pressure regulating portion 98 as an object to be controlled by the control portion 203. The hydraulic-pressure limiting portion 201 operates when the vehicle is in its stopped state and the power source is effective, i.e., limits the wheel-cylinder pressure such that if the target pressure is higher than the pre-set upper limit of the wheel-cylinder pressure for the stopped state of the vehicle, then the upper limit is supplied to the low-pass filter 202. On the other hand, when the vehicle is running, or when the vehicle is stopped and the power source is ineffective, the hydraulic-pressure limiting portion 201 does not operate, i.e., does not limit the wheel-cylinder pressure, so that the target pressure is supplied, as it is, i.e., irrespective of the magnitude thereof, to the low-pass filter 202.

In the present brake control apparatus, the low-pass filter 202 is constituted by, e.g., a digital filter. The digital filter multiplies (a) the last processed value which was obtained in the last filtering operation and (b) the current input value from which the high-frequency component thereof is to be removed, by a first and a second positive coefficient the sum of which is equal to one and each of which is smaller than one, respectively, and thereby obtains the current processed value (i.e., the control pressure) to be used to control the wheel-cylinder pressure. The first positive coefficient by which (a) the last processed value is multiplied is greater than the second positive coefficient by which (b) the current input value is multiplied. That is, the current processed value or the control pressure is less influenced by the current input value than the last processed value. Thus, the high-frequency component is removed from the current input value. Based on the control pressure obtained in the filtering operation and the actual wheel-cylinder pressure detected by the wheel-cylinder pressure sensor 102 through 108, the control portion 203 controls the pressure-increase valve 80 through 86 or the pressure-decrease valve 90 through 96 of the hydraulic-pressure regulating portion 98, so that the actual wheel-cylinder pressure may be controlled to the control pressure as the control target.

When the hydraulic-pressure limiting portion 201 operates and the target pressures are kept limited under the upper limit of the wheel-cylinder pressure for the stopped state of the vehicle, that upper limit is used as the current processed value as the output value of the low-pass filter 202, i.e., the control pressure (from which the high-frequency component thereof has been removed) to be used to control the wheel-cylinder pressure. Thus, the wheel-cylinder pressure is controlled to the upper limit thereof for the stopped state of the vehicle. Meanwhile, if the power source is turned ineffective in the state in which the vehicle is stopped, then the hydraulic-pressure limiting portion 201 stops limiting the wheel-cylinder pressure, so that the target pressure determined based on the stroke of depression of the brake pedal 2 is supplied to the low-pass filter 202 without being limited by the limiting portion 201. Thus, the high-frequency component of the target pressure is removed by the above-described calculation. Therefore, when the pressure-increase valve 80 through 86 or the pressure-decrease valve 90 through 96 of the hydraulic-pressure regulating portion 98 is controlled by the control portion 203 to reach the target pressure obtained in the filtering operation, the wheel-cylinder pressure is moderately increased from the upper limit thereof for the stopped state of the vehicle. Likewise, when the brake pedal 2 is returned back, the target pressure is filtered or processed by the low-pass filter 202 to remove the high-frequency component of the target pressure, so that the wheel-cylinder pressure is moderately decreased.

The wheel-cylinder pressure is controlled according to the braking control routine represented by the flow chart of FIG. 11.

When the vehicle is running and a negative judgment is made at Step S104, the control of the brake ECU 150 goes to Step S105 to read in the target pressure determined at Step S103, so that the low-pass filter 202 processes the target pressure and obtains a control pressure. Since the low-pass filter 202 removes only the high-frequency component of the target pressures, the low-pass filter 202 does not influence the control of the wheel-cylinder pressure based on the stroke of depression of the brake pedal 2 by the driver during the running of the vehicle. If the power source is judged as being effective when the vehicle is stopped and the engine 182 is cranking, a positive judgment is made at Step S107 and a negative judgment is made at Step S112, so that the control goes to Step S109. If no pressure-increase action has been carried out before the control proceeds with Step S109, a negative judgment is made at Step S109, and the control goes to Step S110 to control the wheel-cylinder pressure under the upper limit thereof for the stopped state of the vehicle. More specifically described, the target pressure determined at Step S103 is read in and, if the target pressure is higher than the upper limit of the wheel-cylinder pressure for the stopped state of the vehicle, the wheel-cylinder pressure is controlled while the upper limit is used as the target pressure. Even if the wheel-cylinder pressure may be controlled to the upper limit thereof for the stopped state of the vehicle, the low-pass filter 202 operates logically. However, if the target pressure is higher than the upper limit of the wheel-cylinder pressure for the stopped state of the vehicle, the new input values for the respective filtering operations are each equal to the upper limit, i.e., are constant. That is, the control pressures obtained by the operations of the low-pass filter 202 are each equal to the upper limit. Thus, the low-pass filter 202 need not operate. Therefore, when the upper limit of the wheel-cylinder pressure is restricted at Step S110 of the braking control routine, the low-pass filter 202 is not operated to process the new input values. On the other hand, if the target pressure is smaller than the upper limit of the wheel-cylinder pressure for the stopped state of the vehicle, then the wheel-cylinder pressure is controlled to the target pressure. Since, however, the target pressure is considerably low, no problems occur from the fact that the low-pass filter 202 is not operated. Also in the case where the vehicle is stopped, the engine 182 is not cranking, the power source is effective, and no pressure-increase action has been carried out, then a negative judgment is made at each of Steps S107, S108, and S109, and the control goes to the above-described Step S110.

On the other hand, if the power source is judged as being ineffective when the vehicle is stopped and the engine 182 is cranking, a positive judgment is made at each of Steps S107 and S112, and the control goes to Step S113 wherein the brake ECU 150 does not limit the wheel-cylinder pressure to the upper limit thereof for the stopped state of the vehicle, i.e., cancels the limitation. At Step S113, the wheel-cylinder pressure is increased while being restrained. More specifically described, at Step S113, the low-pass filter 202 performs calculation to remove the high-frequency component of the target pressures determined at Step S103. If the vehicle is stopped and the engine 182 is before cranking, the control goes to Step S110 to control the wheel-cylinder pressure under the upper limit thereof for the stopped state of the vehicle. To this end, the low-pass filter 202 calculates in such a manner that the upper limit of the wheel-cylinder pressure for the stopped state of the vehicle is used as the last processed value and the target pressure determined at Step S103 is used as the new input value. At Step S110, the low-pass filter 202 does not perform calculation. However, even in the case where the filter 202 is adapted to perform calculation at Step S110, when the wheel-cylinder pressure is controlled under the upper limit thereof for the stopped state of the vehicle, the last processed value is equal to the upper limit. Therefore, when Step S113 is carried out for the first time, the upper limit may be used, for convenience, as the last processed value, i.e., the last control pressure from which the high-frequency component has been removed, so as to obtain the current processed value, i.e., the current control pressure from which the high-frequency component has been removed. Then, the pressure-increase valve 80 through 86 is controlled so that the wheel-cylinder pressure may become equal to the current control pressure. In addition, at Step S113, the wheel-cylinder-pressure rapid-increase flag F2 is set to one (F2=1).

When Step S113 is carried out for the next time, the current processed value that is obtained in the current calculation and is stored in the memory of the computer (i.e., the brake ECU 150), is used as the last processed value, and a target pressure newly determined at Step S103 is used as the new input value. Thereafter, while Step S113 is repeated, the same calculation is performed to determine each control pressure. Since the high-frequency component of the target pressures is removed by the low-pass filter 202, the wheel-cylinder pressure is moderately increased from the upper limit thereof for the stopped state of the vehicle. Meanwhile, if the brake pedal 2 is returned back by the driver while Step S113 is carried out, the target pressure is decreased and accordingly the value obtained by the calculation of the low-pass filter 202 is also decreased. Since the high-frequency component of the target pressure is removed by the low-pass filter 202, the wheel-cylinder pressure is moderately decreased.

If the power source is turned effective when the engine 182 is cranking, and if one or more pressure-increase actions have been carried out, a positive judgment is made at Step S107, a negative judgment is made at Step S112, and a positive judgment is made at Step S109, so that the control proceeds with Step S114 to decrease the wheel-cylinder pressure. In this case, the low-pass filter 202 performs calculation by using, as the last processed value, the current processed value that was calculated at Step S113 or S111 immediately before the control proceeds with Step S114 and using, as the new input value, the upper limit of the wheel-cylinder pressure for the stopped state of the vehicle. In this case, irrespective of the magnitude of the stroke of the brake pedal 2, the upper limit of the wheel-cylinder pressure for the stopped state of the vehicle is used as the target pressure, i.e., the new input value. Since the high-frequency component of the target pressures is removed by the low-pass filter 202, the wheel-cylinder pressure is moderately decreased toward the upper limit thereof for the stopped state of the vehicle. In the present embodiment, the digital filter used as the low-pass filter 202 at Step S114 have the same coefficients as those of the digital filter used as the low-pass filter 202 at Step S113. However, the digital filter used at Step S114 may have different coefficients than those of the digital filter used at Step S113.

If the power source is judged as being ineffective when the engine 182 is not cranking, a positive judgment is made at Step S108, so that the control proceeds with Step S111 to permit the wheel-cylinder pressure to be increased. In this case, the low-pass filter 202 performs calculation in the same manner as the manner employed at Step S113. Since the high-frequency component of the target pressures is removed by the low-pass filter 202, the wheel-cylinder pressure is moderately increased. At Step S111, the wheel-cylinder pressure may be decreased. In this case, the low-pass filter 202 performs calculation in the same manner as the manner employed at Step S113. Since the high-frequency component of the target pressures is removed by the low-pass filter 202, the wheel-cylinder pressure is moderately decreased.

If the power source is changed from its ineffective state to its effective state when the engine 182 is not cranking, a negative judgment is made at each of Steps S107 and S108, and a positive judgment is made at Step S109, so that the control proceeds with Step S114. In this case, owing to the calculation of the low-pass filter 202, the wheel-cylinder pressure is moderately decreased.

In the present embodiment, a portion of the brake ECU 150 that carries out Step S103 provides the target-value determining portion 200; a portion of the brake ECU 150 that controls, at Steps S105, S110, S111, S113, and S114, the pressure-increase valve 80 through 86 and the pressure-decrease valve 90 through 96 and thereby controls the wheel-cylinder pressure provides the hydraulic-pressure-regulating-valve control portion 203 as a hydraulic-pressure control portion as a brake-operation-force control portion; a portion of the brake ECU 150 that controls, at Step S110, the wheel-cylinder pressure under the upper limit thereof for the stopped state of the vehicle provides the hydraulic-pressure limiting portion 201 as a brake-operation-force limiting portion; a portion of the brake ECU 150 that carries out Steps S111 and S113 provides a limitation canceling portion; a portion of the brake ECU 150 that reads in, at Steps S105, S111, and S113, the target pressure determined at Step S103, and uses, at Steps 110 and S114, the upper limit of the wheel-cylinder pressure for the stopped state of the vehicle, as the control pressure, provides a target-pressure supplying portion; and a portion of the brake ECU 150 that uses, at Steps S105, S111, S113, and S114, the digital filter to perform calculation and thereby remove the high-frequency component provides the low-pass filter 202.

The rapid change of the operation force of the brake 14 through 20, caused by the cancellation of the limitation to the operation force, may be restrained by decreasing a control gain used to control the operation force, from a normal control gain to a restraining control gain. This feature is embodied as a fifth embodiment shown in FIG. 13.

Figure 13:
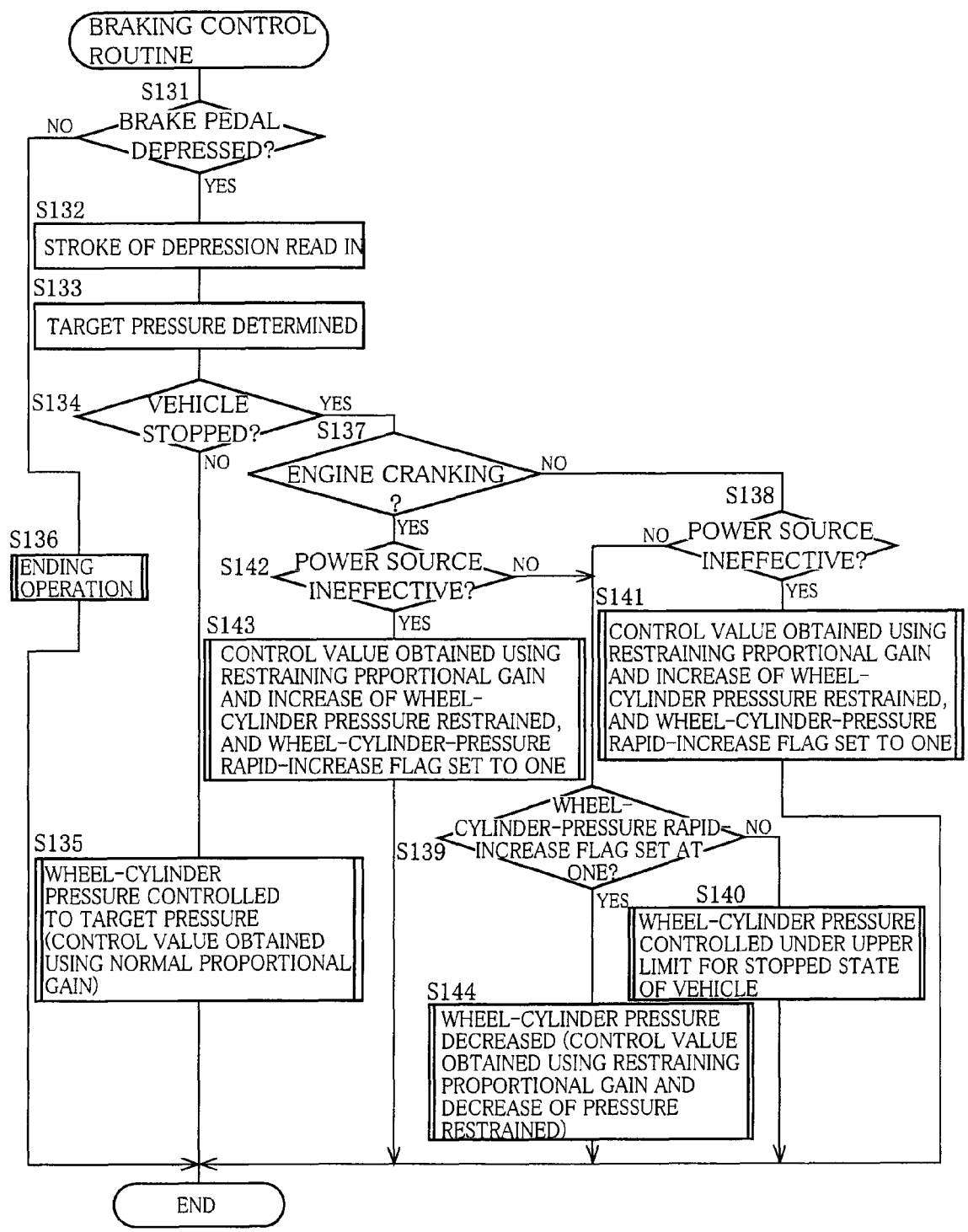
FIG. 13 is a flow chart representing another braking control routine stored in a memory of a computer as an essential component of a brake ECU that controls another hydraulic brake system including another brake control apparatus as a fifth embodiment of the present invention.

The fifth embodiment differs from the second embodiment shown in FIGS. 7 and 8 only in that the fifth embodiment employs, in place of the braking control routine of FIG. 7, a braking control routine of FIG. 13 in which Steps S131 through S134, S136 through S140, and S142 are identical with Steps S51 through S54, S56 through S60, and S62, respectively, and only Steps S135, S141, S143, and S144 differ from Steps S55, S61, S63, and S64, respectively.

In the present brake control apparatus, if a target value of the wheel-cylinder pressure (i.e., a target pressure) is determined based on a stroke of depression of the brake pedal 2, then a control value is obtained by multiplying, using a normal proportional gain, a deviation as a difference of the target pressure and an actual wheel-cylinder pressure detected by the wheel-cylinder pressure sensor 102 through 108. If the power source is judged as being ineffective when the engine 182 is cranking, then the deviation is multiplied with a restraining proportional gain smaller than the normal proportional gain so as to obtain a control value. Therefore, the increase or decrease of the wheel-cylinder pressure is restrained.

The present brake control apparatus is operated according to the braking control routine shown in FIG. 13. The normal proportional gain is used, at Step S135, to obtain a control value for controlling the wheel-cylinder pressure to the target pressure. The pressure-increase valve 80 through 86 or the pressure-decrease valve 90 through 96 is so controlled that the control values approach zero, irrespective of whether the wheel-cylinder pressure may be increased or decreased. If the power source is judged as being ineffective when the engine 182 is cranking, the control of the brake ECU 150 goes to Step S143 to obtain, using the restraining proportional gain, a control value and control the pressure-increase valve 80 through 86 or the pressure-decrease valve 90 through 96 so that the control values approach zero. That is, the wheel-cylinder pressure is moderately increased at a restrained gradient. At Step S143, the wheel-cylinder pressure is decreased if the brake pedal 2 is returned back to some degree. In this case, too, the restraining proportional gain is used. Therefore, the wheel-cylinder pressure is moderately decreased.

If the power source is changed from its ineffective state to its effective state, the control goes to Step S144 to decrease the wheel-cylinder pressure toward the upper limit thereof for the stopped state of the vehicle. At Step S144, too, a restraining proportional gain smaller than a normal proportional gain is used as the proportional gain with which a deviation as a difference of the actual wheel-cylinder pressure and the upper limit of the wheel-cylinder pressure for the stopped state of the vehicle is multiplied to obtain a control value. Based on the thus obtained control values, the pressure-decrease valve 90 through 96 is controlled so that the wheel-cylinder pressure is moderately decreased at a restrained gradient. The restraining proportional gain used at Step S144 is the same as that used at Step S143. However, the restraining proportional gain used at Step S144 may differ from that used at Step S143.

If the power source is judged as being ineffective when the vehicle is in its stopped state but the engine 182 is not in its cranking state, the control goes to Step S141 to permit increasing of the wheel-cylinder pressure. At Step S141, the same restraining proportional gain as that used at Step S143 is used. Therefore, the wheel-cylinder pressure is moderately increased. At Step S141, the wheel-cylinder pressure may be decreased. In this case, too, since the restraining proportional gain is used, the wheel-cylinder pressure is moderately decreased.

In the present embodiment, a portion of the brake ECU 150 that controls, at Steps S135, S141, S143, and S144, the pressure-increase valve 80 through 86 or the pressure-decrease valve 90 through 96 and thereby controls the wheel-cylinder pressure provides a hydraulic-pressure control portion as a brake-operation-force control portion; and a portion of the brake ECU 150 that calculates, at Steps S141, S143, and S144, the control values by using the restraining control gain smaller than the normal control gain used at Step S135, provides a gain decreasing portion.

The rapid change of the operation force of the brake 14 through 20, caused by the cancellation of the limitation to the operation force, may be restrained by such an operation of the sensor ignoring (disabling) portion that for a pre-set time duration after the voltage of the power source has lowered to a value not higher than a pre-set value, the sensor ignoring portion does not ignore the wheel-speed sensor 120 through 126. This feature is embodied as a sixth embodiment shown in FIG. 14.

Figure 14:
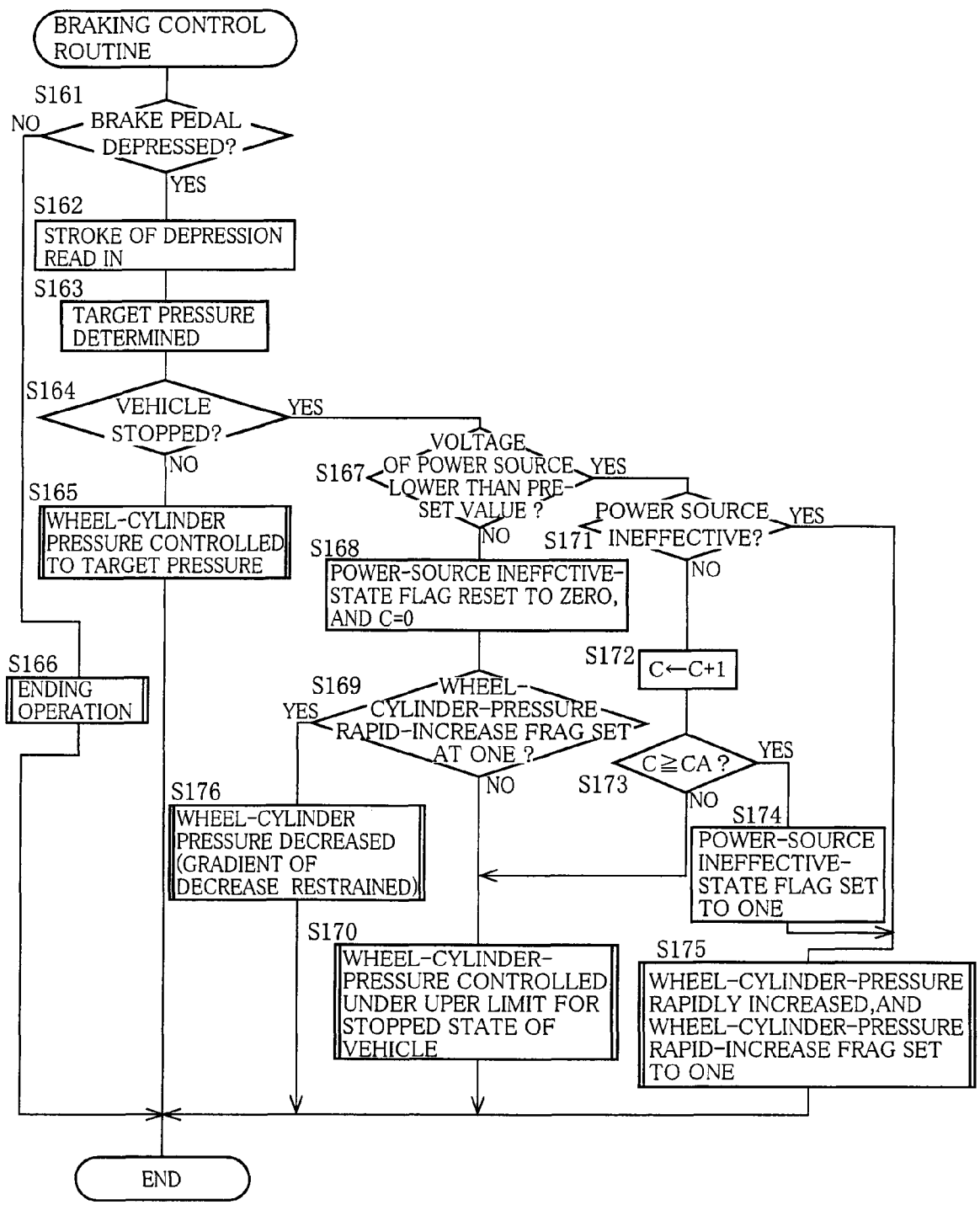
FIG. 14 is a flow chart representing another braking control routine stored in a memory of a computer as an essential component of a brake ECU that controls another hydraulic brake system including another brake control apparatus as a sixth embodiment of the present invention.

The sixth embodiment differs from the first embodiment shown in FIGS. 1 through 6, only in that the sixth embodiment employs, in place of the braking control routine of FIG. 4, a braking control routine of FIG. 14 in which Steps S161 through S166, S169, S170, S176, and S175 are identical with Steps S1 through S6 and S8 through S11, respectively, and only Steps S167, S168, and S171 through S174 differ from Step S7.

The present brake control apparatus is operated according to the braking control routine shown in FIG. 14. At Step S164, if the vehicle is judged as being stopped, based on the wheel speed obtained based on the output signal of the wheel-speed sensor 120 through 126, the control of the brake ECU 150 goes to Step S167 to judge whether the voltage of the battery 186 is lower than the pre-set value. If a positive judgment is made at Step S167, the control goes to Steps S171, S172, and S173 to measure a time duration in which the voltage of the battery 186 remains lower than the pre-set value. In this time duration, the wheel-cylinder pressure is controlled, at Step S170, under the upper limit thereof for the stopped state of the vehicle. The time duration in which the voltage of the battery 186 remains lower than the pre-set value is measured, at Step S172, by increasing a number, C, counted by a counter. At Step S173, the counted number C is compared with a reference number, CA, corresponding to the pre-set time duration. This time duration is pre-set to be somewhat longer than, e.g., a time duration in which the voltage of the power source temporarily lowers due to the cranking of the engine 182. Therefore, if the lowering of the voltage of the power source is just temporary or transient, the wheel-cylinder pressure is just limitedly controlled under the upper limit thereof for the stopped state of the vehicle, and accordingly one or more passengers in the vehicle can be prevented from feeling uneasy because of the generation of sounds resulting from the flowing of the brake liquid.

If the state in which the voltage of the power source is lower than the pre-set value continues for more than the pre-set time duration, then a positive judgment is made at Step S173 and accordingly the control goes to Step S174 to set a power-source ineffective-state flag, F4, to one (i.e., F4=1), indicating that the power-source is in its ineffective state. Step S174 is followed by Step S175 that is identical with Step S11 of FIG. 4. At Step S175, the brake ECU 150 permits the wheel-cylinder pressure to be increased, at a restrained gradient, according to the stroke of depression of the brake pedal 2. Only after the state in which the voltage of the power source is lower than the pre-set value has continued for more than the pre-set time duration, the wheel-speed sensor 120 through 126 is disabled, the limitation to the wheel-cylinder pressure is canceled, and the wheel-cylinder pressure is permitted to be increased. At Step S175, the wheel-cylinder-pressure rapid-increase flag F2 is set to one (F2=1).

While the voltage of the battery 186 remains lower than the pre-set value after the power-source ineffective-state flag F4 is set to one (i.e., F4=1) at Step S174, a positive judgment is made at Step S171, and the control goes to Step S175 to increase the wheel-cylinder pressure to the value corresponding to the stroke of depression of the brake pedal 2. Meanwhile, if the voltage of the battery 186 becomes higher than the pre-set value, a negative judgment is made at Step S167 and the control goes to Step S168 to reset the power-source ineffective-state flag F4 to zero (i.e., F4=0) and clear the number C counted by the counter, to zero (i.e., C=0). In this case, if the wheel-cylinder-pressure rapid-increase flag F2 is set at one (F2=1), then a positive judgment is made at Step S169 and the control goes to Step S176 to decrease, at a restrained gradient, the wheel-cylinder pressure down to the upper limit thereof for the stopped state of the vehicle.

In the present embodiment, a portion of the brake ECU 150 that carries out Steps S172 and S173 provides an ignoring (disabling) delaying portion.

Whether the wheel-speed sensors 120 through 126 are ineffective may be judged by judging whether each of a plurality of vehicle-running estimating conditions is satisfied. For example, in the embodiment shown in FIG. 6, if at least one of the six vehicle-running estimating conditions is satisfied, then it is judged or estimated that the vehicle is running. However, it is possible to estimate that the vehicle is running if all of those six vehicle-running estimating conditions are satisfied. In the latter case, if at least one of the six vehicle-running estimating conditions is not satisfied, then it is judged or estimated that the vehicle is in its stopped state.

The above-indicated, plurality of vehicle-running estimating conditions may include, in addition to the six vehicle-running estimating conditions shown in FIG. 6, (a) a seventh condition that the operation range of the transmission is not the P (parking) range, (b) an eighth condition that a parking brake of the vehicle is not in use, (c) a ninth condition that each of the respective pressure of the respective wheel cylinders of the hydraulic brakes 14 through 20 corresponding to the four wheels 6 through 12 is smaller than a pre-set value, (d) a tenth condition that a vehicle speed calculated to be displayed on a vehicle-speed meter of the vehicle is higher than a pre-set value, (e) an eleventh condition that an alarm lamp provided on an instrument panel of the vehicle is OFF (the alarm lamp is kept ON before cranking of the engine 182 and is turned OFF after the cranking), and (f) a twelfth condition that the electric voltage of the auxiliary power source device 190 of the hydraulic brake system is higher than a pre-set value. Each of the six vehicle-running estimating conditions (a) through (f) can be said as a vehicle-stopped-state estimating condition. The six vehicle-running estimating conditions (a) through (f) may be used with the six vehicle-running estimating conditions shown in FIG. 6 to judge whether the wheel-speed sensors 120 through 126 are ineffective, or at least one of the combined, twelve vehicle-running estimating conditions may be selected and used for that judgment.

Whether the engine 182 is in its cranking state may be judged based on a magnitude of an electric current supplied to a starter of the vehicle. Since the electric current is supplied to the starter only when the engine 182 is started, it is possible to judge, based on the magnitude of the electric current, whether the engine 182 is in its cranking state. The electric current supplied to the starter may be measured by an ammeter.

An operating-force detecting device as a brake-operation-amount detecting device may be used to detect an operating force applied to the brake operating member, e.g., a depressing force applied to the brake pedal 2. In this case, based on the detected depressing force, the target value of the wheel-cylinder pressure may be determined. Alternatively, based on both the stroke of operation of the brake operating member and the operating force applied to the same, the target value of the wheel-cylinder pressure may be determined.

It is to be understood that the present invention may be embodied with various changes, modifications, and improvements that may occur to a person skilled in the art without departing from the spirit and scope of the invention defined in the appended claims.

What is claimed is:

1. A brake control apparatus for controlling a plurality of brakes of a vehicle having a plurality of wheels, the apparatus comprising:
   a stopped-state detecting portion which detects, based on a speed of at least one of the wheels detected by at least one wheel-speed sensor, a stopped state of the vehicle;
   an operation-force limiting portion which limits, based on a detection of the stopped state of the vehicle by the stopped-state detecting portion, an operation force of at least one of the brakes, such that an upper limit of the operation force is an intermediate level of an operation-force range used when the stopped state is not detected;
   a sensor ignoring portion which ignores said at least one wheel-speed sensor, when an electric voltage supplied from a power source to said at least one wheel-speed sensor is not higher than a reference value;
   a limitation canceling portion which cancels a limitation of the operation force by the operation-force limiting portion, when the sensor ignoring portion ignores said at least one wheel-speed sensor; and
   a rapid-change restraining portion which restrains a rapid change of the operation force caused by a cancellation of the limitation of the operation force by the limitation canceling portion.

2. The brake control apparatus according to claim 1, wherein the plurality of brakes comprise a plurality of hydraulic brakes each of which includes a wheel cylinder and operates, upon supplying of a hydraulic pressure to the wheel cylinder, to restrain a rotation of a corresponding one of the plurality of wheels,
   wherein the operation-force limiting portion comprises a hydraulic-pressure limiting portion which limits, based on the detection of the stopped state of the vehicle by the stopped-state detecting portion, the hydraulic pressure of the wheel cylinder of at least one of the hydraulic brakes, such that an upper limit of the hydraulic pressure is an intermediate level of a hydraulic-pressure range used when the stopped state is not detected, and wherein the rapid-change restraining portion comprises a hydraulic-pressure rapid-change restraining portion which restrains a rapid change of the hydraulic pressure of the wheel cylinder.

3. The brake control apparatus according to claim 1, wherein the rapid-change restraining portion comprises:
- a stopped-state estimating portion which estimates, based on information from a member other than said at least one wheel-speed sensor, the stopped state of the vehicle; and
- a limitation-canceling inhibiting portion which inhibits the limitation canceling portion from canceling the limitation of the operation force by the operation-force limiting portion, when the electric voltage of the power source is not higher than the reference value in a state in which the stopped-state estimating portion estimates that the vehicle is in the stopped state thereof.

4. The brake control apparatus according to claim 1, wherein the rapid-change restraining portion comprises a gradient restraining portion which permits the limitation canceling portion to cancel the limitation of the operation force of the brake, and restrains at least one of a gradient of increase, and a gradient of decrease, of the operation force caused by the cancellation of the limitation of the operation force.

5. The brake control apparatus according to claim 1, further comprising an operation-force control portion which controls the operation force of said at least one brake according to a control gain, wherein the rapid-change restraining portion comprises a gain decreasing portion which decreases the control gain from a normal-control gain to a restraining-control gain.

6. The brake control apparatus according to claim 1, further comprising:
- a brake operating member which is operable to operate the brakes;
- a target-value determining portion which determines, based on an amount of operation of the brake operating member, a target value of the operation force of each of the brakes;
- an operation-force control portion which controls the operation force of said each brake;
- a target-value supplying portion which normally supplies the target value determined by the target-value determining portion, to the operation-force control portion, wherein when the operation-force limiting portion limits the operation force of said at least one brake, such that the upper limit of the operation force is smaller than the target value determined by said target-value determining portion, the target-value supplying portion supplies said upper limit to the operation-force control portion and, when the limitation canceling portion cancels the limitation of the operation force by the operation-force limiting portion, the target-value supplying portion again supplies the determined target value to the operation-force control portion; and
- a low-pass filter which removes a high-frequency component of the target values supplied by the target-value supplying portion,
wherein the rapid-change restraining portion comprises the low-pass filter.

7. The brake control apparatus according to claim 1, wherein the rapid-change restraining portion comprises an increase restraining portion which permits the limitation canceling portion to cancel the limitation of the operation force of said at least one brake, and restrains at least one of a gradient of increase, and an amount of increase, of the operation force after the cancellation of the limitation of the operation force.

8. The brake control apparatus according to claim 7, wherein the increase restraining portion comprises a restricted-value changing portion which changes a first restricted value as said upper limit of the operation force, provided by the operation-force limiting portion, to a second restricted value greater than the first restricted value.

9. The brake control apparatus according to claim 1, wherein the rapid-change restraining portion comprises an ignoring delaying portion which delays, for a pre-set time duration after the electric voltage supplied from the power source to said at least one wheel-speed sensor becomes not higher than the reference value, an ignoring of said at least one wheel-speed sensor by the sensor ignoring portion.

* * * * *